US012361953B2

(12) United States Patent
Shlomot et al.

(10) Patent No.: US 12,361,953 B2
(45) **Date of Patent: *Jul. 15, 2025**

(54) ENCODING AND DECODING METHODS, AND ENCODING AND DECODING APPARATUSES FOR STEREO SIGNAL

(71) Applicant: HUAWEI TECHNOLOGIES CO., LTD., Guangdong (CN)

(72) Inventors: Eyal Shlomot, Long Beach, CA (US); Haiting Li, Beijing (CN); Bin Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/350,969

(22) Filed: Jul. 12, 2023

(65) Prior Publication Data

US 2023/0352034 A1 Nov. 2, 2023

Related U.S. Application Data

(63) Continuation of application No. 17/555,083, filed on Dec. 17, 2021, now Pat. No. 11,741,974, which is a (Continued)

(30) Foreign Application Priority Data

Jul. 25, 2017 (CN) ......................... 201710614326.7

(51) Int. Cl.
*G10L 19/008* (2013.01)
*G10L 19/20* (2013.01)
(Continued)

(52) U.S. Cl.
CPC ............ *G10L 19/008* (2013.01); *G10L 19/20* (2013.01); *G10L 19/24* (2013.01); *H04S 3/008* (2013.01); *H04S 2420/03* (2013.01)

(58) Field of Classification Search
CPC . G10L 19/008; G10L 19/005; G10L 19/0018; G10L 19/002; G10L 19/00;
(Continued)

(56) References Cited

U.S. PATENT DOCUMENTS

2003/0219130 A1 11/2003 Baumgarte et al.
2011/0288872 A1* 11/2011 Liu ....................... G10L 19/008 704/500

(Continued)

FOREIGN PATENT DOCUMENTS

CN 101188878 A 5/2008
CN 101582259 A 11/2009

(Continued)

OTHER PUBLICATIONS

ITU-T G.711.1, "Stereo embedded extension for ITU-T G.711.1", Recommendation ITU-T G711.1, "Whoe wideband positive ITD smoothing selection", formula F.6-18, p. 154, September, pp. 139-178, (Year: 2012).*

(Continued)

*Primary Examiner* — Leshui Zhang
(74) *Attorney, Agent, or Firm* — Fish & Richardson P.C.

(57) ABSTRACT

This disclosure provides a encoding method, and an encoder for a multi-channel signal. The encoding method includes: obtaining a first ITD of a current frame of a multi-channel signal includes an initial left channel signal and an initial right channel signal; obtaining a second ITD of the current frame based on the first ITD and a third ITD of a previous frame of the multi-channel signal; performing delay alignment on the initial left channel signal and the initial right channel signal based on the second ITD, to obtain an aligned left channel signal and an aligned right channel signal; and encoding the aligned left channel signal and the aligned right channel signal.

3 Claims, 17 Drawing Sheets

Related U.S. Application Data continuation of application No. 16/751,954, filed on Jan. 24, 2020, now Pat. No. 11,238,875, which is a continuation of application No. PCT/CN2018/096973, filed on Jul. 25, 2018.

(51) Int. Cl.
*G10L 19/24* (2013.01)
*H04S 3/00* (2006.01)

(58) Field of Classification Search
CPC ..... G10L 19/167; G10L 19/022; G10L 19/20; G10L 19/24; G10L 19/08; G10L 19/02; G10L 19/0017; G10L 19/038; H04S 3/008; H04S 3/00; H04S 2420/03; H04S 3/004; H04S 5/00; H04S 7/00
USPC ................... 704/500–504; 381/1–23; 700/94
See application file for complete search history.

(56) References Cited

U.S. PATENT DOCUMENTS

| | | | | |
|---|---|---|---|---|
| 2013/0301835 | A1* | 11/2013 | Briand | G10L 19/008 381/17 |
| 2015/0010155 | A1 | 1/2015 | Virette et al. | |
| 2015/0269948 | A1 | 9/2015 | Purnhagen et al. | |
| 2016/0254002 | A1* | 9/2016 | Zhang | G10L 19/008 381/23 |

FOREIGN PATENT DOCUMENTS

| | | | | |
|---|---|---|---|---|
| CN | 102292767 | A | 12/2011 | |
| CN | 103460283 | A | 12/2013 | |
| CN | 104681029 | A * | 6/2015 | G10L 19/005 |
| WO | 2017049398 | A1 | 3/2017 | |

OTHER PUBLICATIONS

Extended European Search Report issued in European Application No. 18839134.6 on Jun. 17, 2020, 7 pages.

Lindblom et al., "Flexible sum-difference stereo coding based on time-aligned signal components," 2005 IEEE Workshop on Applications of Signal Processing to Audio and Acoustics, New Platz, NY, XP010854377, Oct. 16-19, 2005, pp. 255-258.

Office Action issued in Korean Application No. 2020-7004835 on Jul. 13, 2021, 5 pages (with English translation).

PCT International Search Report and Written Opinion in International Application No. PCT/CN2018/096973 dated Oct. 29, 2018, 16 pages (With English Translation).

Tournery et al., "Improved Time Delay Analysis/Synthesis for Parametric Stereo Audio Coding," Convention Paper 6753, Proceedings of the 120th Audio Engineering Society Convention, Paris, France, XP040373082, May 20-23, 2006, 9 pages.

* cited by examiner

ENCODING AND DECODING METHODS, AND ENCODING AND DECODING APPARATUSES FOR STEREO SIGNAL

CROSS-REFERENCE TO RELATED APPLICATIONS

This application is a continuation of U.S. patent application Ser. No. 17/555,083, filed on Dec. 17, 2021, which is a continuation of U.S. patent application Ser. No. 16/751,954, filed on Jan. 24, 2020, now U.S. Pat. No. 11,238,875, which is a continuation of International Application No. PCT/CN2018/096973, filed on Jul. 25, 2018, which claims priority to Chinese Patent Application No. 201710614326.7, filed on Jul. 25, 2017. All of the afore-mentioned patent applications are hereby incorporated by reference in their entireties.

TECHNICAL FIELD

This disclosure relates to the field of audio signal encoding and decoding technologies, and more specifically, to encoding and decoding methods, and encoding and decoding apparatuses for a stereo signal.

BACKGROUND

A parametric stereo encoding and decoding technology, a time-domain stereo encoding and decoding technology, and the like may be used to encode a stereo signal. Encoding and decoding the stereo signal by using the time-domain stereo encoding and decoding technology generally includes the following processes:

An encoding process:

- estimating an inter-channel time difference of the stereo signal;
- performing delay alignment on the stereo signal based on the inter-channel time difference;
- performing, based on a time-domain downmixing processing parameter, time-domain downmixing processing on a signal that is obtained after the delay alignment, to obtain a primary-channel signal and a secondary-channel signal; and
- encoding the inter-channel time difference, the time-domain downmixing processing parameter, the primary-channel signal, and the secondary-channel signal, to obtain an encoded bitstream.

A decoding process:

- decoding the bitstream to obtain a primary-channel signal, a secondary-channel signal, a time-domain downmixing processing parameter, and an inter-channel time difference;
- performing time-domain upmixing processing on the primary-channel signal and the secondary-channel signal based on the time-domain downmixing processing parameter, to obtain a left-channel reconstructed signal and a right-channel reconstructed signal that are obtained after the time-domain upmixing processing; and
- adjusting, based on the inter-channel time difference, a delay of the left-channel reconstructed signal and the right-channel reconstructed signal that are obtained after the time-domain upmixing processing, to obtain a decoded stereo signal.

In the processes of encoding and decoding the stereo signal by using the time-domain stereo encoding technology, although the inter-channel time difference is considered, because there are encoding and decoding delays in the processes of encoding and decoding the primary-channel signal and the secondary-channel signal, there is a deviation between the inter-channel time difference of the stereo signal that is finally output from a decoding end and the inter-channel time difference of the original stereo signal, which affects a stereo sound image of the stereo signal output by decoding.

SUMMARY

This disclosure provides encoding and decoding methods, and encoding and decoding apparatuses for a stereo signal, to reduce a deviation between an inter-channel time difference of a stereo signal that is obtained by decoding and an inter-channel time difference of an original stereo signal.

According to a first aspect, an encoding method for a stereo signal is provided. The encoding method includes: determining an inter-channel time difference in a current frame; performing interpolation processing based on the inter-channel time difference in the current frame and an inter-channel time difference in a previous frame of the current frame, to obtain an inter-channel time difference after the interpolation processing in the current frame; performing delay alignment on a stereo signal in the current frame based on the inter-channel time difference in the current frame, to obtain a stereo signal after the delay alignment in the current frame; performing time-domain downmixing processing on the stereo signal after the delay alignment in the current frame, to obtain a primary-channel signal and a secondary-channel signal in the current frame; quantizing the inter-channel time difference after the interpolation processing in the current frame, and writing a quantized inter-channel time difference into a bitstream; and quantizing the primary-channel signal and the secondary-channel signal in the current frame, and writing a quantized primary-channel signal and a quantized secondary-channel signal into the bitstream.

By performing interpolation processing on the inter-channel time difference in the current frame and the inter-channel time difference in the previous frame of the current frame, and encoding and then writing the inter-channel time difference after the interpolation processing in the current frame into a bitstream, an inter-channel time difference in the current frame, which is obtained by decoding, by a decoding end, a received bitstream, can match the bitstream including the primary-channel signal and the secondary-channel signal in the current frame, so that the decoding end can perform decoding based on the inter-channel time difference in the current frame that matches the bitstream including the primary-channel signal and the secondary-channel signal in the current frame. This can reduce a deviation between an inter-channel time difference of a stereo signal that is finally obtained by decoding and an inter-channel time difference of an original stereo signal. Therefore, accuracy of a stereo sound image of the stereo signal that is finally obtained by decoding is improved.

Specifically, when the encoding end encodes the primary-channel signal and the secondary-channel signal that are obtained after the downmixing processing, and when the decoding end decodes the bitstream to obtain a primary-channel signal and a secondary-channel signal, there are encoding and decoding delays. However, when the encoding end encodes the inter-channel time difference, and when the decoding end decodes the bitstream to obtain an inter-channel time difference, the same encoding and decoding delays do not exist, and an audio codec performs processing based on frames. Therefore, there is a delay between a primary-channel signal and a secondary-channel signal in the current frame that are obtained by decoding, by the decoding end, a bitstream in the current frame and an inter-channel time difference in the current frame that is obtained by decoding the bitstream in the current frame. In this case, if the decoding end still uses the inter-channel time difference in the current frame to adjust a delay of a left-channel reconstructed signal and a right-channel reconstructed signal in the current frame that are obtained after subsequent time-domain upmixing processing is performed on the primary-channel signal and the secondary-channel signal in the current frame that are obtained by decoding the bitstream, there is a relatively large deviation between the inter-channel time difference of the finally obtained stereo signal and the inter-channel time difference of the original stereo signal. However, the encoding end performs interpolation processing to adjust the inter-channel time difference in the current frame and the inter-channel time difference in the previous frame of the current frame to obtain the inter-channel time difference after the interpolation processing in the current frame, encodes the inter-channel time difference after the interpolation processing, and transmits the encoded inter-channel time difference together with a bitstream including a primary-channel signal and a secondary-channel signal that are obtained by encoding the current frame to the decoding end, so that the inter-channel time difference in the current frame obtained by decoding, by the decoding end, the bitstream can match the left-channel reconstructed signal and the right-channel reconstructed signal in the current frame that are obtained by the decoding end. Therefore, the deviation between the inter-channel time difference of the finally obtained stereo signal and the inter-channel time difference of the original stereo signal is reduced by performing delay adjustment.

With reference to the first aspect, in some implementations of the first aspect, the inter-channel time difference after the interpolation processing in the current frame is calculated according to a formula $A=\alpha\cdot B+(1-\alpha)\cdot C$ where A is the inter-channel time difference after the interpolation processing in the current frame, B is the inter-channel time difference in the current frame, C is the inter-channel time difference in the previous frame of the current frame, a is a first interpolation coefficient, and $0<\alpha<1$.

The inter-channel time difference can be adjusted by using the formula, so that the finally obtained inter-channel time difference after interpolation processing in the current frame is between the inter-channel time difference in the current frame and the inter-channel time difference in the previous frame of the current frame, and the inter-channel time difference after the interpolation processing in the current frame matches an inter-channel time difference obtained by decoding currently as much as possible.

With reference to the first aspect, in some implementations of the first aspect, the first interpolation coefficient α is inversely proportional to an encoding and decoding delay, and is directly proportional to a frame length of the current frame, where the encoding and decoding delay includes an encoding delay in a process of encoding, by the encoding end, a primary-channel signal and a secondary-channel signal that are obtained after time-domain downmixing processing, and a decoding delay in a process of decoding, by the decoding end, the bitstream to obtain a primary-channel signal and a secondary-channel signal.

With reference to the first aspect, in some implementations of the first aspect, the first interpolation coefficient α satisfies a formula $\alpha=(N-S)/N$, where S is the encoding and decoding delay, and N is the frame length of the current frame.

With reference to the first aspect, in some implementations of the first aspect, the first interpolation coefficient α is pre-stored.

Pre-storing the first interpolation coefficient α can reduce calculation complexity of an encoding process and improve encoding efficiency.

With reference to the first aspect, in some implementations of the first aspect, the inter-channel time difference after the interpolation processing in the current frame is calculated according to a formula $A=(1-\beta)\cdot B+\beta\cdot C$, where A is the inter-channel time difference after the interpolation processing in the current frame, B is the inter-channel time difference in the current frame, C is the inter-channel time difference in the previous frame of the current frame, B is a second interpolation coefficient, and $0<\beta<1$.

The inter-channel time difference can be adjusted by using the formula, so that the finally obtained inter-channel time difference after interpolation processing in the current frame is between the inter-channel time difference in the current frame and the inter-channel time difference in the previous frame of the current frame, and the inter-channel time difference after the interpolation processing in the current frame matches an inter-channel time difference obtained by decoding currently as much as possible.

With reference to the first aspect, in some implementations of the first aspect, the second interpolation coefficient β is directly proportional to an encoding and decoding delay, and is inversely proportional to a frame length of the current frame, where the encoding and decoding delay includes an encoding delay in a process of encoding, by the encoding end, a primary-channel signal and a secondary-channel signal that are obtained after time-domain downmixing processing, and a decoding delay in a process of decoding, by the decoding end, the bitstream to obtain a primary-channel signal and a secondary-channel signal.

With reference to the first aspect, in some implementations of the first aspect, the second interpolation coefficient β satisfies a formula $\beta=S/N$, where S is the encoding and decoding delay, and N is the frame length of the current frame.

With reference to the first aspect, in some implementations of the first aspect, the second interpolation coefficient β is pre-stored.

Pre-storing the second interpolation coefficient β can reduce calculation complexity of an encoding process and improve encoding efficiency.

According to a second aspect, a decoding method for a multi-channel signal is provided. The method includes: decoding a bitstream to obtain a primary-channel signal and a secondary-channel signal in a current frame and an inter-channel time difference in the current frame; performing time-domain upmixing processing on the primary-channel signal and the secondary-channel signal in the current frame, to obtain a left-channel reconstructed signal and a right-channel reconstructed signal that are obtained after the time-domain upmixing processing; performing interpolation processing based on the inter-channel time difference in the current frame and an inter-channel time difference in a previous frame of the current frame, to obtain an inter-channel time difference after the interpolation processing in the current frame; and adjusting a delay of the left-channel reconstructed signal and the right-channel reconstructed signal based on the inter-channel time difference after the interpolation processing in the current frame.

By performing interpolation processing on the inter-channel time difference in the current frame and the inter-channel time difference in the previous frame of the current frame, the inter-channel time difference after the interpolation processing in the current frame can match the primary-channel signal and the secondary-channel signal in the current frame that are obtained by decoding. This can reduce a deviation between an inter-channel time difference of a stereo signal that is finally obtained by decoding and an inter-channel time difference of an original stereo signal. Therefore, accuracy of a stereo sound image of the stereo signal that is finally obtained by decoding is improved.

With reference to the second aspect, in some implementations of the second aspect, the inter-channel time difference after the interpolation processing in the current frame is calculated according to a formula $A=\alpha\cdot B+(1-\alpha)\cdot C$, where A is the inter-channel time difference after the interpolation processing in the current frame, B is the inter-channel time difference in the current frame, C is the inter-channel time difference in the previous frame of the current frame, a is a first interpolation coefficient, and $0<\alpha<1$.

The inter-channel time difference can be adjusted by using the formula, so that the finally obtained inter-channel time difference after interpolation processing in the current frame is between the inter-channel time difference in the current frame and the inter-channel time difference in the previous frame of the current frame, and the inter-channel time difference after the interpolation processing in the current frame matches an inter-channel time difference obtained by decoding currently as much as possible.

With reference to the second aspect, in some implementations of the second aspect, the first interpolation coefficient α is inversely proportional to an encoding and decoding delay, and is directly proportional to a frame length of the current frame, where the encoding and decoding delay includes an encoding delay in a process of encoding, by an encoding end, a primary-channel signal and a secondary-channel signal that are obtained after time-domain downmixing processing, and a decoding delay in a process of decoding, by a decoding end, the bitstream to obtain a primary-channel signal and a secondary-channel signal.

With reference to the second aspect, in some implementations of the second aspect, the first interpolation coefficient α satisfies a formula $\alpha=(N-S)/N$, where S is the encoding and decoding delay, and N is the frame length of the current frame.

With reference to the second aspect, in some implementations of the second aspect, the first interpolation coefficient α is pre-stored.

Pre-storing the first interpolation coefficient α can reduce calculation complexity of a decoding process and improve decoding efficiency.

With reference to the second aspect, in some implementations of the second aspect, the inter-channel time difference after the interpolation processing in the current frame is calculated according to a formula $A=(1-\beta)\cdot\beta+\beta\cdot C$, where A is the inter-channel time difference after the interpolation processing in the current frame, B is the inter-channel time difference in the current frame, C is the inter-channel time difference in the previous frame of the current frame, β is a first interpolation coefficient, and $0<\beta<1$.

The inter-channel time difference can be adjusted by using the formula, so that the finally obtained inter-channel time difference after interpolation processing in the current frame is between the inter-channel time difference in the current frame and the inter-channel time difference in the previous frame of the current frame, and the inter-channel time difference after the interpolation processing in the current frame matches an inter-channel time difference obtained by decoding currently as much as possible.

With reference to the second aspect, in some implementations of the second aspect, the second interpolation coefficient β is directly proportional to an encoding and decoding delay, and is inversely proportional to a frame length of the current frame, where the encoding and decoding delay includes an encoding delay in a process of encoding, by an encoding end, a primary-channel signal and a secondary-channel signal that are obtained after time-domain downmixing processing, and a decoding delay in a process of decoding, by a decoding end, the bitstream to obtain a primary-channel signal and a secondary-channel signal.

With reference to the second aspect, in some implementations of the second aspect, the second interpolation coefficient β satisfies a formula $\beta=S/N$, where S is the encoding and decoding delay, and N is the frame length of the current frame.

With reference to the second aspect, in some implementations of the second aspect, the second interpolation coefficient β is pre-stored.

Pre-storing the second interpolation coefficient β can reduce calculation complexity of a decoding process and improve decoding efficiency.

According to a third aspect, an encoding apparatus is provided. The encoding apparatus includes a module configured to perform the first aspect or various implementations of the first aspect.

According to a fourth aspect, a decoding apparatus is provided. The decoding apparatus includes a module configured to perform the second aspect or various implementations of the second aspect.

According to a fifth aspect, an encoding apparatus is provided. The encoding apparatus includes a storage medium and a central processing unit, where the storage medium may be a nonvolatile storage medium and stores a computer executable program, and the central processing unit is connected to the nonvolatile storage medium and executes the computer executable program to implement the method in the first aspect or various implementations of the first aspect.

According to a sixth aspect, a decoding apparatus is provided. The decoding apparatus includes a storage medium and a central processing unit, where the storage medium may be a nonvolatile storage medium and stores a computer executable program, and the central processing unit is connected to the nonvolatile storage medium and executes the computer executable program to implement the method in the second aspect or various implementations of the second aspect.

According to a seventh aspect, a computer-readable storage medium is provided. The computer-readable storage medium stores program code to be executed by a device, and the program code includes an instruction used to perform the method in the first aspect or various implementations of the first aspect.

According to an eighth aspect, a computer-readable storage medium is provided. The computer-readable storage medium stores program code to be executed by a device, and the program code includes an instruction used to perform the method in the second aspect or various implementations of the second aspect.

DESCRIPTION OF EMBODIMENTS

The following describes the technical solutions in this disclosure with reference to the accompanying drawings.

Figure 1:
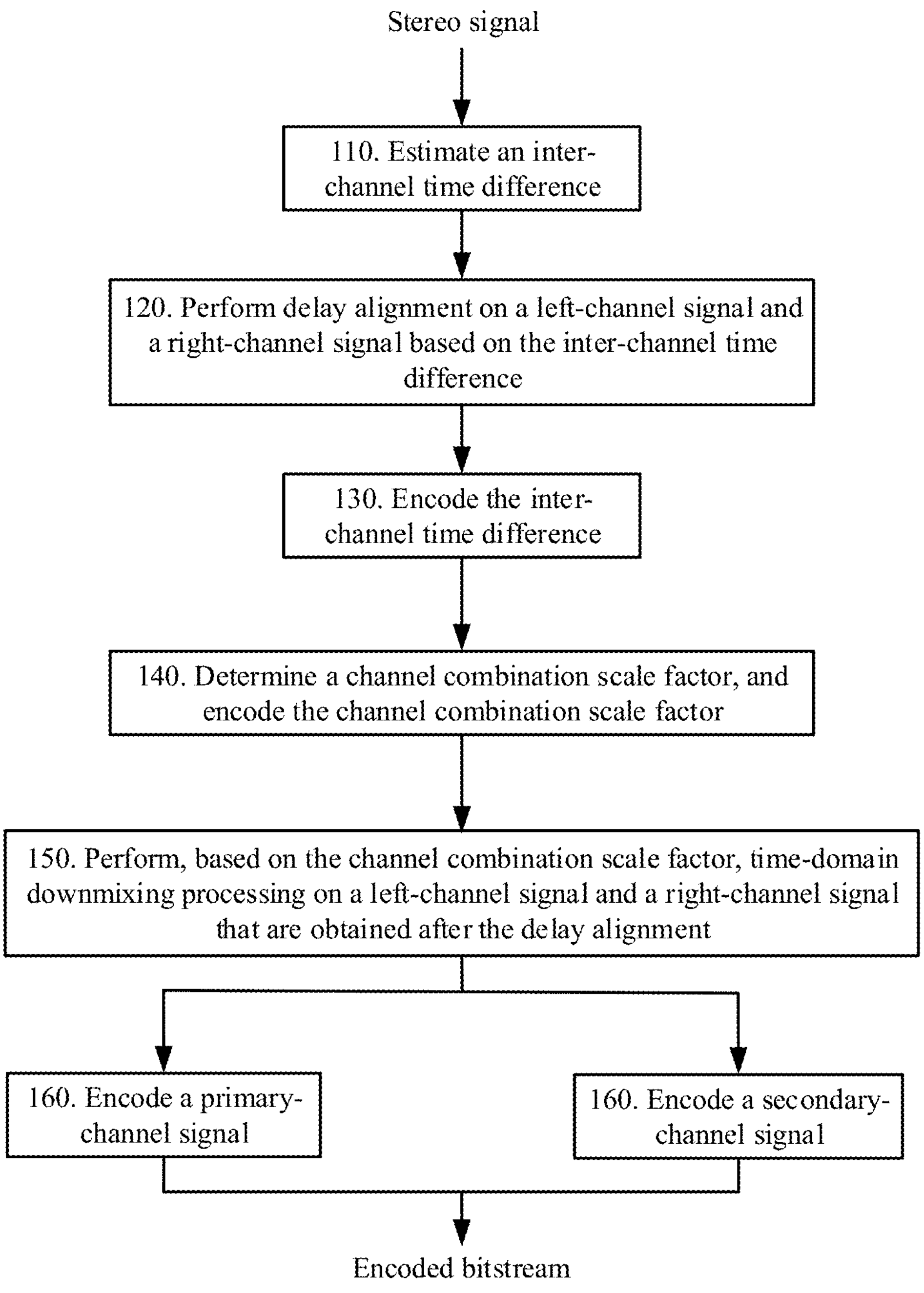
FIG. 1 is a schematic flowchart of an existing time-domain stereo encoding method.
Figure 2:
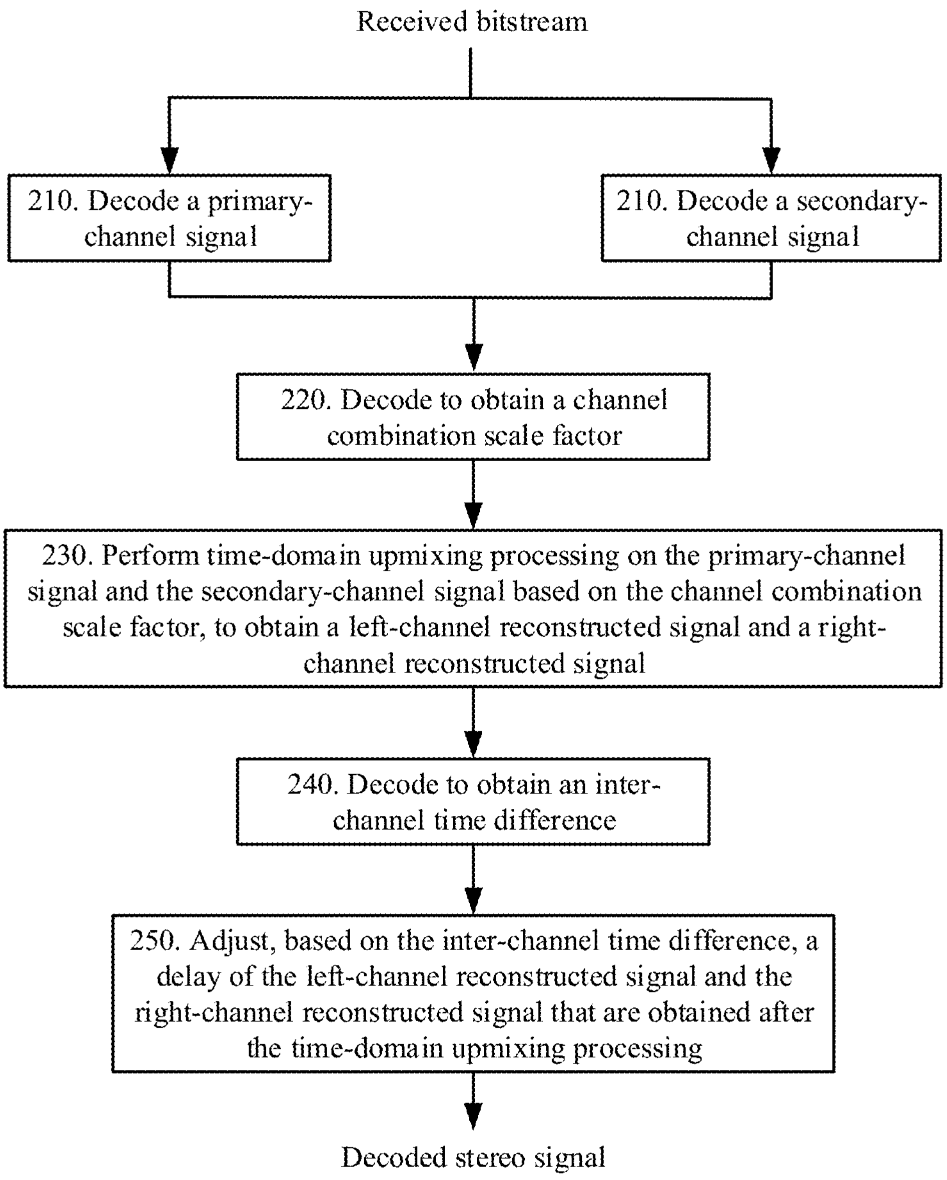
FIG. 2 is a schematic flowchart of an existing time-domain stereo decoding method.

To better understand encoding and decoding methods in the embodiments of this disclosure, the following first describes in detail processes of existing time-domain stereo encoding and decoding methods with reference to FIG. 1 and FIG. 2.

FIG. 1 is a schematic flowchart of the existing time-domain stereo encoding method. The encoding method 100 specifically includes the following steps.

110. An encoding end estimates an inter-channel time difference of a stereo signal, to obtain the inter-channel time difference of the stereo signal.

The stereo signal includes a left-channel signal and a right-channel signal. The inter-channel time difference of the stereo signal is a time difference between the left-channel signal and the right-channel signal.

120. Perform delay alignment on the left-channel signal and the right-channel signal based on the estimated inter-channel time difference.

130. Encode the inter-channel time difference of the stereo signal, to obtain an encoding index of the inter-channel time difference, and write the encoding index into a stereo encoded bitstream.

140. Determine a channel combination scale factor, encode the channel combination scale factor to obtain an encoding index of the channel combination scale factor, and write the encoding index into the stereo encoded bitstream.

150. Perform, based on the channel combination scale factor, time-domain downmixing processing on a left-channel signal and a right-channel signal that are obtained after the delay alignment.

160. Separately encode a primary-channel signal and a secondary-channel signal that are obtained after the downmixing processing, to obtain bitstreams of the primary-channel signal and the secondary-channel signal, and write the bitstreams into the stereo encoded bitstream.

FIG. 2 is a schematic flowchart of the existing time-domain stereo decoding method. The decoding method 200 specifically includes the following steps.

210. Decode a received bitstream to obtain a primary-channel signal and a secondary-channel signal.

The step 210 is equivalent to separately performing primary-channel signal decoding and secondary-channel signal decoding to obtain the primary-channel signal and the secondary-channel signal.

220. Decode the received bitstream to obtain a channel combination scale factor.

230. Perform time-domain upmixing processing on the primary-channel signal and the secondary-channel signal based on the channel combination scale factor, to obtain a left-channel reconstructed signal and a right-channel reconstructed signal that are obtained after the time-domain upmixing processing.

240. Decode the received bitstream to obtain an inter-channel time difference.

250. Adjust, based on the inter-channel time difference, a delay of the left-channel reconstructed signal and the right-channel reconstructed signal that are obtained after the time-domain upmixing processing, to obtain a decoded stereo signal.

In the existing time-domain stereo encoding and decoding methods, an additional encoding delay (this delay may be specifically a time required for encoding the primary-channel signal and the secondary-channel signal) and an additional decoding delay (this delay may be specifically a time required for decoding the primary-channel signal and the secondary-channel signal) are introduced in the processes of encoding (specifically shown in the step 160) and decoding (specifically shown in the step 210) the primary-channel signal and the secondary-channel signal. However, there are no same encoding delay and same decoding delay in the processes of encoding and decoding the inter-channel time difference. Therefore, there is a deviation between the inter-channel time difference of the stereo signal that is finally obtained by decoding and the inter-channel time difference of the original stereo signal, and then there is a delay between a signal in the stereo signal obtained by decoding and the same signal in the original stereo signal, which affects accuracy of a stereo sound image of the stereo signal obtained by decoding.

Specifically, in the processes of encoding and decoding the inter-channel time difference, there is no encoding delay and decoding delay that are the same as those in the processes of encoding and decoding the primary-channel signal and the secondary-channel signal. Therefore, a primary-channel signal and a secondary-channel signal that are obtained by decoding currently by the decoding end do not match an inter-channel time difference obtained by decoding currently.

Figure 3:
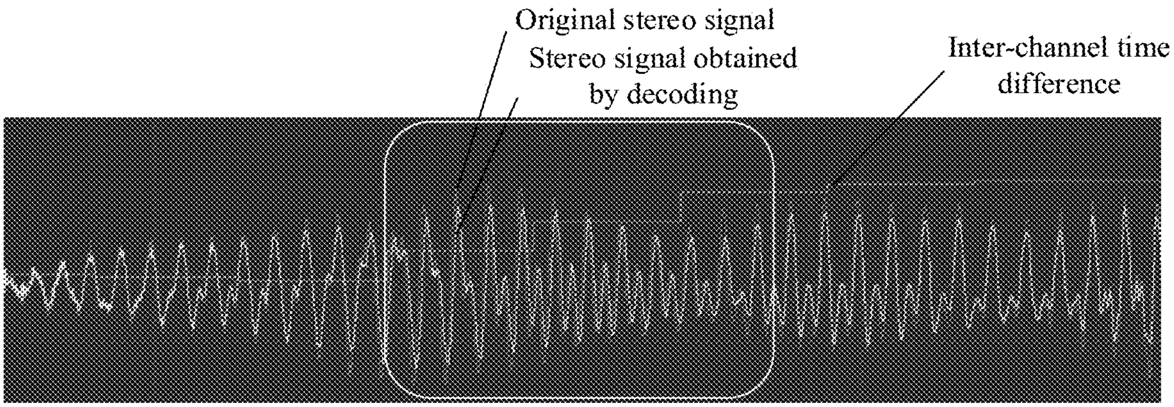
FIG. 3 is a schematic diagram of a delay deviation between a stereo signal obtained by decoding by using an existing time-domain stereo encoding and decoding technology and an original stereo signal.

FIG. 3 shows a delay between a signal in a stereo signal obtained by decoding by using an existing time-domain stereo encoding and decoding technology and the same signal in an original stereo signal. As shown in FIG. 3, when a value of an inter-channel time difference between stereo signals in different frames changes greatly (as shown by an area in a rectangular frame in FIG. 3), an obvious delay occurs between the signal in the stereo signal that is finally obtained by decoding by a decoding end and the same signal in the original stereo signal (the signal in the stereo signal that is finally obtained by decoding obviously lags behind the same signal in the original stereo signal). However, when the value of the inter-channel time difference between the stereo signals in different frames does not change obviously (as shown by an area outside the rectangular frame in FIG. 3), the delay between the signal in the stereo signal that is finally obtained by decoding by the decoding end and the same signal in the original stereo signal is not obvious.

Therefore, this disclosure provides a new encoding method for a stereo channel signal. According to the encoding method, interpolation processing is performed on an inter-channel time difference in a current frame and an inter-channel time difference in a previous frame of the current frame, to obtain an inter-channel time difference after the interpolation processing in the current frame, and the inter-channel time difference after the interpolation processing in the current frame is encoded and then transmitted to a decoding end. However, delay alignment is still performed by using the inter-channel time difference in the current frame. Compared with the prior art, the inter-channel time difference in the current frame obtained in this disclosure better matches a primary-channel signal and a secondary-channel signal that are obtained after encoding and decoding, and has a relatively high degree of matching with a corresponding stereo signal. This reduces a deviation between an inter-channel time difference of a stereo signal that is finally obtained by decoding by a decoding end and an inter-channel time difference of an original stereo signal. Therefore, an effect of the stereo signal that is finally obtained by decoding by the decoding end can be improved.

It should be understood that the stereo signal in this disclosure may be an original stereo signal, a stereo signal including two signals that are included in a multi-channel signal, or a stereo signal including two signals that are jointly generated by a plurality of signals included in a multi-channel signal. The encoding method for a stereo signal may also be an encoding method for a stereo signal that is used in a multi-channel encoding method. The decoding method for a stereo signal may also be a decoding method for a stereo signal that is used in a multi-channel decoding method.

Figure 4:
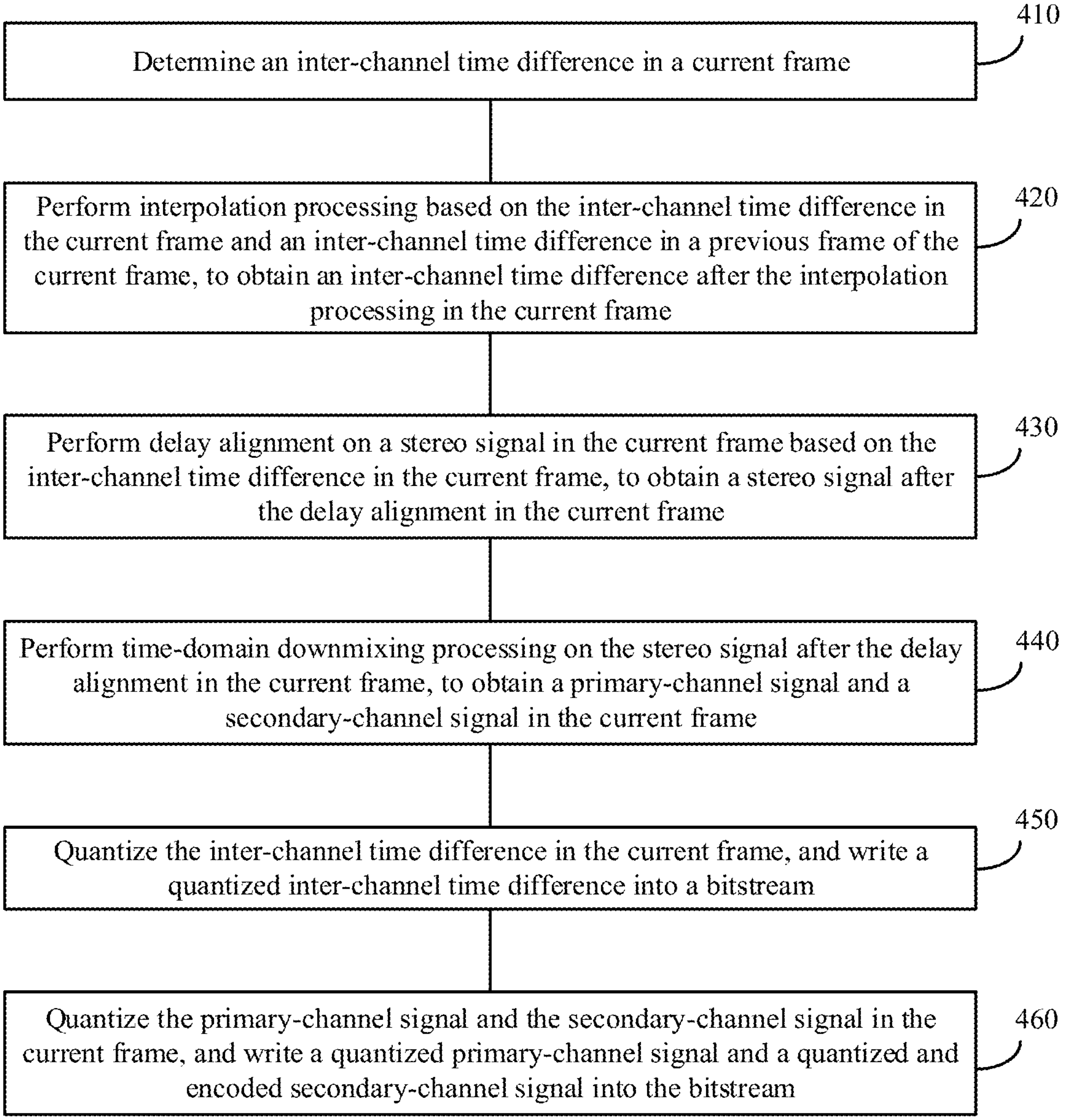
FIG. 4 is a schematic flowchart of an encoding method for a stereo signal according to an embodiment of this disclosure.

FIG. 4 is a schematic flowchart of an encoding method for a stereo signal according to an embodiment of this disclosure. The method 400 may be executed by an encoding end, and the encoding end may be an encoder or a device having a function of encoding a stereo signal. The method 400 specifically includes the following steps.

410. Determine an inter-channel time difference in a current frame.

It should be understood that a stereo signal processed herein may include a left-channel signal and a right-channel signal, and the inter-channel time difference in the current frame may be obtained by estimating a delay of the left-channel signal and the right-channel signal. An inter-channel time difference in a previous frame of the current frame may be obtained by estimating a delay of a left-channel signal and a right-channel signal in a process of encoding a stereo signal in the previous frame. For example, a cross-correlation coefficient of a left channel and a right channel is calculated based on the left-channel signal and the right-channel signal in the current frame, and then an index value corresponding to a maximum value of the cross-correlation coefficient is used as the inter-channel time difference in the current frame.

Specifically, delay estimation may be performed in a manner described in an example 1 to an example 3, to obtain the inter-channel time difference in the current frame.

Example 1

In a current sampling rate, a maximum value and a minimum value of the inter-channel time difference are respectively $T_{max}$ and $T_{min}$, where $T_{max}$ and $T_{min}$ are preset real numbers, and $T_{max}>T_{min}$. In this case, a maximum value of the cross-correlation coefficient of the left and right channels, whose index value is between the maximum value and the minimum value of the inter-channel time difference, may be searched for. Finally, an index value corresponding to the searched maximum value of the cross-correlation coefficient of the left and right channels is determined as the inter-channel time difference in the current frame. Specifically, values of $T_{max}$ and 7 min may be 40 and −40 respectively. In this way, the maximum value of the cross-correlation coefficient of the left and right channels may be searched in a range of $-40 \le i < 40$, and then an index value corresponding to the maximum value of the cross-correlation coefficient is used as the inter-channel time difference in the current frame.

Example 2

In a current sampling rate, a maximum value and a minimum value of the inter-channel time difference are respectively $T_{max}$ and $T_{min}$, where $T_{max}$ and 7 min are preset real numbers, and $T_{max}>T_{min}$. A cross-correlation function of the left and right channel is calculated based on the left-channel signal and the right-channel signal in the current frame. In addition, smoothing processing is performed on the calculated cross-correlation function of the left and right channels in the current frame based on a cross-correlation function of the left and right channels in previous L frames (L is an integer greater than or equal to 1), to obtain a smoothed cross-correlation function of the left and right channels. Then, a maximum value of a cross-correlation coefficient of the left and right channels after the smoothing processing is searched for in a range of $T_{min} \le i \le T_{max}$, and an index value i corresponding to the maximum value is used as the inter-channel time difference in the current frame.

Example 3

After the inter-channel time difference in the current frame is estimated according to the method in the example 1 or the example 2, inter-frame smoothing processing is performed on an inter-channel time difference in previous M frames (M is an integer greater than or equal to 1) of the current frame and the estimated inter-channel time difference in the current frame, and an inter-channel time difference obtained after the smoothing processing is used as the inter-channel time difference in the current frame.

It should be understood that, before estimating the delay of the left-channel signal and the right-channel signal (the left-channel signal and the right-channel signal herein are time-domain signals) to obtain the inter-channel time difference in the current frame, time-domain preprocessing may be further performed on the left-channel signal and the right-channel signal in the current frame. Specifically, high-pass filtering processing may be performed on the left-channel signal and the right-channel signal in the current frame to obtain a preprocessed left-channel signal and a preprocessed right-channel signal in the current frame. In addition, the time-domain preprocessing herein may alternatively be other processing in addition to the high-pass filtering processing. For example, pre-emphasis processing is performed.

420. Perform interpolation processing based on the inter-channel time difference in the current frame and the inter-channel time difference in the previous frame of the current frame, to obtain an inter-channel time difference after the interpolation processing in the current frame.

It should be understood that the inter-channel time difference in the current frame may be a time difference between the left-channel signal in the current frame and the right-channel signal in the current frame, and the inter-channel time difference in the previous frame of the current frame may be a time difference between a left-channel signal in the previous frame of the current frame and a right-channel signal in the previous frame of the current frame.

It should be understood that performing interpolation processing based on the inter-channel time difference in the current frame and the inter-channel time difference in the previous frame of the current frame is equivalent to performing weighted average processing on the inter-channel time difference in the current frame and the inter-channel time difference in the previous frame of the current frame. In this way, the finally obtained inter-channel time difference after the interpolation processing in the current frame is between the inter-channel time difference in the current frame and the inter-channel time difference in the previous frame of the current frame.

There may be a plurality of specific manners for performing interpolation processing based on the inter-channel time difference in the current frame and the inter-channel time difference in the previous frame of the current frame. For example, interpolation processing may be performed in the following manner 1 and manner 2.

Manner 1:

The inter-channel time difference after the interpolation processing in the current frame is calculated according to a formula (1).

$$A=\alpha\cdot B+(1-\alpha)\cdot C \quad (1)$$

In the formula (1), A is the inter-channel time difference after the interpolation processing in the current frame, B is the inter-channel time difference in the current frame, C is the inter-channel time difference in the previous frame of the current frame, a is a first interpolation coefficient, and α is a real number satisfying 0<α<1.

The inter-channel time difference can be adjusted by using the formula A=α·B+ (1−α)·C so that the finally obtained inter-channel time difference after interpolation processing in the current frame is between the inter-channel time difference in the current frame and the inter-channel time difference in the previous frame of the current frame, and the inter-channel time difference after the interpolation processing in the current frame matches, as much as possible, an inter-channel time difference of an original stereo signal that is not encoded and decoded.

Specifically, assuming that the current frame is an $i^{th}$ frame, the previous frame of the current frame is an $(i-1)^{th}$ frame. In this case, an inter-channel time difference in the $i^{th}$ frame may be determined according to a formula (2).

$$d\_int(i)=\alpha\cdot d(i)+(1-\alpha)\cdot d(i-1) \quad (2)$$

In the formula (2), d_int(i) is an inter-channel time difference after interpolation processing in the $i^{th}$ frame, d(i) is the inter-channel time difference in the current frame, d(i−1) is an inter-channel time difference in the $(i-1)^{th}$ frame, and α has a same meaning as α in the formula (1), and is also a first interpolation coefficient.

The first interpolation coefficient may be directly set by technical personnel. For example, the first interpolation coefficient α may be directly set to 0.4 or 0.6.

In addition, the first interpolation coefficient α may also be determined based on a frame length of the current frame and an encoding and decoding delay. The encoding and decoding delay herein may include an encoding delay in a process of encoding, by the encoding end, a primary-channel signal and a secondary-channel signal that are obtained after time-domain downmixing processing, and a decoding delay in a process of decoding, by a decoding end, a bitstream to obtain a primary-channel signal and a secondary-channel signal. Further, the encoding and decoding delay herein may be a sum of the encoding delay and the decoding delay. The encoding and decoding delay may be determined after an encoding and decoding algorithm used by a codec is determined. Therefore, the encoding and decoding delay is a known parameter for an encoder or a decoder.

Optionally, the first interpolation coefficient α may be specifically inversely proportional to the encoding and decoding delay, and is directly proportional to the frame length of the current frame. In other words, the first interpolation coefficient α decreases as the encoding and decoding delay increases, and increases as the frame length of the current frame increases.

Optionally, the first interpolation coefficient α may be determined according to a formula (3).

$$\alpha=\frac{N-S}{N} \quad (3)$$

In the formula (3), N is the frame length of the current frame, and S is the encoding and decoding delay.

When N=320 and S=192, the following may be obtained according to the formula (3):

$$\alpha=\frac{N-S}{N}=\frac{320-192}{320}=0.4 \quad (4)$$

Finally, it can be obtained that the first interpolation coefficient α is 0.4.

Alternatively, the first interpolation coefficient α is pre-stored. Because the encoding and decoding delay and the frame length may be known in advance, the corresponding first interpolation coefficient α may also be determined and stored in advance based on the encoding and decoding delay and the frame length. Specifically, the first interpolation coefficient may be pre-stored at the encoding end. In this way, when performing interpolation processing, the encoding end may directly perform interpolation processing based on the pre-stored first interpolation coefficient α without calculating a value of the first interpolation coefficient α. This can reduce calculation complexity of an encoding process and improve encoding efficiency.

Manner 2:

The inter-channel time difference in the current frame is determined according to a formula (5).

$$A=(1-\beta)\cdot B+\beta\cdot C \tag{5}$$

In the formula (5), A is the inter-channel time difference after the interpolation processing in the current frame, B is the inter-channel time difference in the current frame, C is the inter-channel time difference in the previous frame of the current frame, β is a second interpolation coefficient, and is a real number satisfying 0<β<1.

The inter-channel time difference can be adjusted by using the formula A=(1−β)·B+β·C, so that the finally obtained inter-channel time difference after interpolation processing in the current frame is between the inter-channel time difference in the current frame and the inter-channel time difference in the previous frame of the current frame, and the inter-channel time difference after the interpolation processing in the current frame matches, as much as possible, an inter-channel time difference of an original stereo signal that is not encoded and decoded.

Specifically, assuming that the current frame is an $i^{th}$ frame, the previous frame of the current frame is an $(i-1)^{th}$ frame. In this case, an inter-channel time difference in the $i^{th}$ frame may be determined according to a formula (6).

$$d\_int(i)=(1-\beta)\cdot d(i)+\beta\cdot d(i-1) \tag{6}$$

In the formula (6), d_int(i) is the inter-channel time difference in the $i^{th}$ frame, d (i) is the inter-channel time difference in the current frame, d(i−1) is an inter-channel time difference in the $(i-1)^{th}$ frame, and β has a same meaning as β in the formula (5), and is also a second interpolation coefficient.

The foregoing interpolation coefficient may be directly set by technical personnel. For example, the second interpolation coefficient β may be directly set to 0.6 or 0.4.

In addition, the second interpolation coefficient β may also be determined based on a frame length of the current frame and an encoding and decoding delay. The encoding and decoding delay herein may include an encoding delay in a process of encoding, by the encoding end, a primary-channel signal and a secondary-channel signal that are obtained after time-domain downmixing processing, and a decoding delay in a process of decoding, by a decoding end, a bitstream to obtain a primary-channel signal and a secondary-channel signal. Further, the encoding and decoding delay herein may be a sum of the encoding delay and the decoding delay.

Optionally, the second interpolation coefficient β may be specifically directly proportional to the encoding and decoding delay. In addition, the second interpolation coefficient β may be specifically inversely proportional to the frame length of the current frame.

Optionally, the second interpolation coefficient β may be determined according to a formula (7).

$$\beta=\frac{S}{N} \tag{7}$$

In the formula (7), N is the frame length of the current frame, and S is the encoding and decoding delay.

When N=320 and S=192, the following may be obtained according to the formula (7):

$$\beta=\frac{S}{N}=\frac{192}{320}=0.6 \tag{8}$$

Finally, it can be obtained that the second interpolation coefficient β is 0.6.

Alternatively, the second interpolation coefficient β is pre-stored. Because the encoding and decoding delay and the frame length may be known in advance, the corresponding second interpolation coefficient β may also be determined and stored in advance based on the encoding and decoding delay and the frame length. Specifically, the second interpolation coefficient β may be pre-stored at the encoding end. In this way, when performing interpolation processing, the encoding end may directly perform interpolation processing based on the pre-stored second interpolation coefficient β without calculating a value of the second interpolation coefficient β. This can reduce calculation complexity of an encoding process and improve encoding efficiency.

430. Perform delay alignment on a stereo signal in the current frame based on the inter-channel time difference in the current frame, to obtain a stereo signal after the delay alignment in the current frame.

When delay alignment is performed on the left-channel signal and the right-channel signal in the current frame, one or two of the left-channel signal and the right-channel signal may be compressed or extended based on the inter-channel time difference in the current frame, so that there is no inter-channel time difference between a left-channel signal and a right-channel signal after the delay alignment. The left-channel signal and the right-channel signal after the delay alignment in the current frame, which are obtained after delay alignment is performed on the left-channel signal and the right-channel signal in the current frame, are stereo signals after the delay alignment in the current frame.

440. Perform time-domain downmixing processing on the stereo signal after the delay alignment in the current frame, to obtain a primary-channel signal and a secondary-channel signal in the current frame.

When time-domain downmixing processing is performed on the left-channel signal and the right-channel signal after the delay alignment, the left-channel signal and the right-channel signal may be down-mixed into a middle channel (Mid channel) signal and a side channel (Side channel) signal. The middle channel signal can indicate related information between the left channel and the right channel, and the side channel signal can indicate difference information between the left channel and the right channel.

Assuming that L represents the left-channel signal and R represents the right-channel signal, the middle channel signal is 0.5×(L+R) and the side channel signal is 0.5×(L−R).

In addition, when time-domain downmixing processing is performed on the left-channel signal and the right-channel signal after the delay alignment, to control a ratio of the left-channel signal and the right-channel signal in the downmixing processing, a channel combination scale factor may be calculated, and then time-domain downmixing processing is performed on the left-channel signal and the right-channel signal the channel combination scale factor, to obtain a primary-channel signal and a secondary-channel signal.

There are a plurality of methods for calculating the channel combination scale factor. For example, a channel combination scale factor in the current frame may be calculated based on frame energy of the left channel and the right channel. A specific process is as follows:

(1). Calculate frame energy of the left-channel signal and the right-channel signal based on the left-channel signal and the right-channel signal after the delay alignment in the current frame.

The frame energy rms_L of the left channel in the current frame satisfies:

$$\text{rms\_L} = \frac{1}{N}\sum_{i=0}^{N-1} x'_L(i) * x'_L(i) \tag{9}$$

The frame energy rms_R of the right channel in the current frame satisfies:

$$\text{rms\_R} = \frac{1}{N}\sum_{i=0}^{N-1} x'_R(i) * x'_R(i) \tag{10}$$

$x'_L(n)$ is the left-channel signal after the delay alignment in the current frame, $x'_R(n)$ is the right-channel signal after the delay alignment in the current frame, n is a sampling point number, and n=0, 1, . . . , N−1.

(2). Calculate the channel combination scale factor in the current frame based on the frame energy of the left channel and the right channel.

The channel combination scale factor ratio in the current frame satisfies:

$$\text{ratio} = \frac{\text{rms\_R}}{\text{rms\_L} + \text{rms\_R}} \tag{11}$$

Therefore, the channel combination scale factor is calculated based on the frame energy of the left-channel signal and the right-channel signal.

After the channel combination scale factor ratio is obtained, time-domain downmixing processing may be performed based on the channel combination scale factor ratio. For example, the primary-channel signal and the secondary-channel signal after the time-domain downmixing processing may be determined according to a formula (12).

$$\begin{bmatrix} Y(n) \\ X(n) \end{bmatrix} = \begin{bmatrix} \text{ratio} & 1-\text{ratio} \\ 1-\text{ratio} & -\text{ratio} \end{bmatrix} * \begin{bmatrix} x'_L(n) \\ x'_R(n) \end{bmatrix} \tag{12}$$

Y(n) is the primary-channel signal in the current frame, X (n) is the secondary-channel signal in the current frame, $x'_L(n)$ is the left-channel signal after the delay alignment in the current frame, $x'_R(n)$ is the right-channel signal after delay alignment in the current frame, n is the sampling point number, n=0, 1, . . . , N−1, N is the frame length, and ratio is the channel combination scale factor.

(3). Quantize the channel combination scale factor, and write a quantized channel combination scale factor into a bitstream.

450. Quantize the inter-channel time difference after the interpolation processing in the current frame, and write a quantized inter-channel time difference into a bitstream.

Specifically, in a process of quantizing the inter-channel time difference after the interpolation processing in the current frame, any quantization algorithm in the prior art may be used to quantize the inter-channel time difference after the interpolation processing in the current frame, to obtain a quantization index. Then, the quantization index is encoded and then written into a bitstream.

460. Quantize the primary-channel signal and the secondary-channel signal in the current frame, and write a quantized primary-channel signal and a quantized secondary-channel signal into the bitstream.

Optionally, a monophonic signal encoding and decoding method may be used to encode the primary-channel signal and the secondary-channel signal that are obtained after the downmixing processing. Specifically, bits of encoding a primary channel and a secondary channel may be allocated based on parameter information obtained in a process of encoding a primary-channel signal in the previous frame and/or a secondary-channel signal in the previous frame and a total number of bits of encoding the primary-channel signal and the secondary-channel signal. Then, the primary-channel signal and the secondary-channel signal are separately encoded based on a bit allocation result, to obtain an encoding index of encoding the primary channel and an encoding index of encoding the secondary channel.

It should be understood that the bitstream obtained after the step 460 includes a bitstream that is obtained after the inter-channel time difference after the interpolation processing in the current frame is quantized and a bitstream that is obtained after the primary-channel signal and the secondary-channel signal are quantized.

Optionally, in the method 400, the channel combination scale factor that is used when time-domain downmixing processing is performed in the step 440 may be quantized, to obtain a corresponding bitstream.

Therefore, the bitstream finally obtained in the method 400 may include the bitstream that is obtained after the inter-channel time difference after the interpolation processing in the current frame is quantized, the bitstream that is obtained after the primary-channel signal and the secondary-channel signal in the current frame are quantized, and the bitstream that is obtained after the channel combination scale factor is quantized.

In this disclosure, the inter-channel time difference in the current frame is used at the encoding end to perform delay alignment, to obtain the primary-channel signal and the secondary-channel signal. However, interpolation processing is performed on the inter-channel time difference in the current frame and the inter-channel time difference in the previous frame of the current frame, so that the inter-channel time difference in the current frame that is obtained after the interpolation processing can match the primary-channel signal and the secondary-channel signal that are obtained by encoding and decoding. The inter-channel time difference after the interpolation processing is encoded and then transmitted to the decoding end, so that the decoding end can perform decoding based on the inter-channel time difference in the current frame that matches the primary-channel signal and the secondary-channel signal that are obtained by decoding. This can reduce a deviation between an inter-channel time difference of a stereo signal that is finally obtained by decoding and an inter-channel time difference of an original stereo signal. Therefore, accuracy of a stereo sound image of the stereo signal that is finally obtained by decoding is improved.

It should be understood that, the bitstream finally obtained in the method 400 may be transmitted to the decoding end, and the decoding end may decode the received bitstream to obtain the primary-channel signal and the secondary-channel signal in the current frame and the inter-channel time difference in the current frame, and adjusts, based on the inter-channel time difference in the current frame, a delay of a left-channel reconstructed signal and a right-channel reconstructed signal that are obtained after time-domain upmixing processing, to obtain a decoded stereo signal. A specific process executed by the decoding end may be the same as the process of the time-domain stereo decoding method in the prior art shown in FIG. 2.

Figure 5:
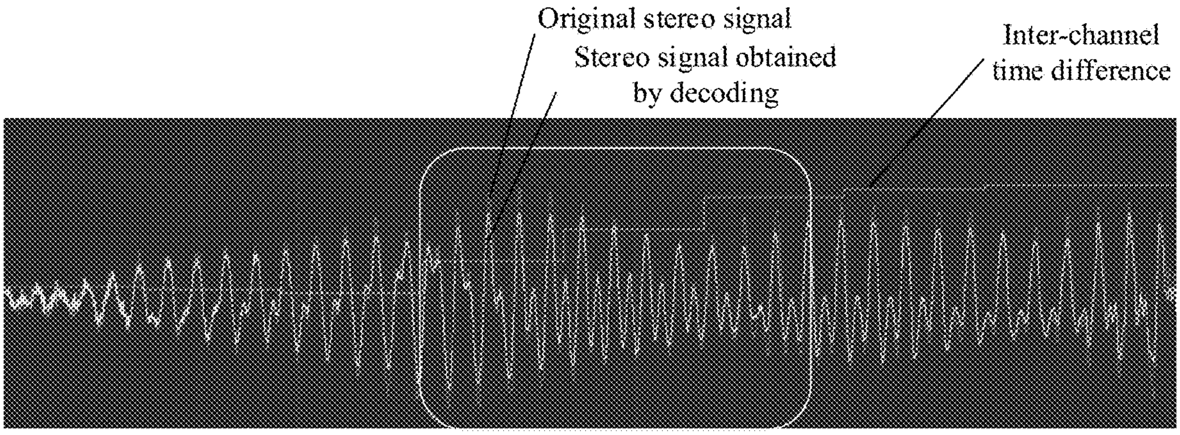
FIG. 5 is a schematic diagram of a delay deviation between a stereo signal obtained by decoding a bitstream that is obtained by using an encoding method for a stereo signal and an original stereo signal according to an embodiment of this disclosure.

The decoding end decodes the bitstream generated in the method 400, and a difference between a signal in the finally obtained stereo signal and the same signal in the original stereo signal may be shown in FIG. 5. By comparing FIG. 5 and FIG. 3, it can be found that, compared with FIG. 3, in FIG. 5, a delay between the signal in the stereo signal that is finally obtained by decoding and the same signal in the original stereo signal has become very small. Particularly, when the value of the inter-channel time difference changes greatly (as shown by an area in a rectangular frame in FIG. 5), a delay between the signal in the channel signal that is finally obtained by the decoding end and the same signal in the original channel signal is also very small. In other words, according to the encoding method for a stereo signal in this embodiment of this disclosure, a deviation between the inter-channel time difference of the stereo signal that is finally obtained by decoding and the inter-channel time difference in the original stereo signal can be reduced.

It should be understood that downmixing processing may be further implemented herein in another manner, to obtain the primary-channel signal and the secondary-channel signal.

A detailed process of the encoding method for a stereo signal in the embodiments of this disclosure is described below with reference to FIG. 6.

Figure 6:
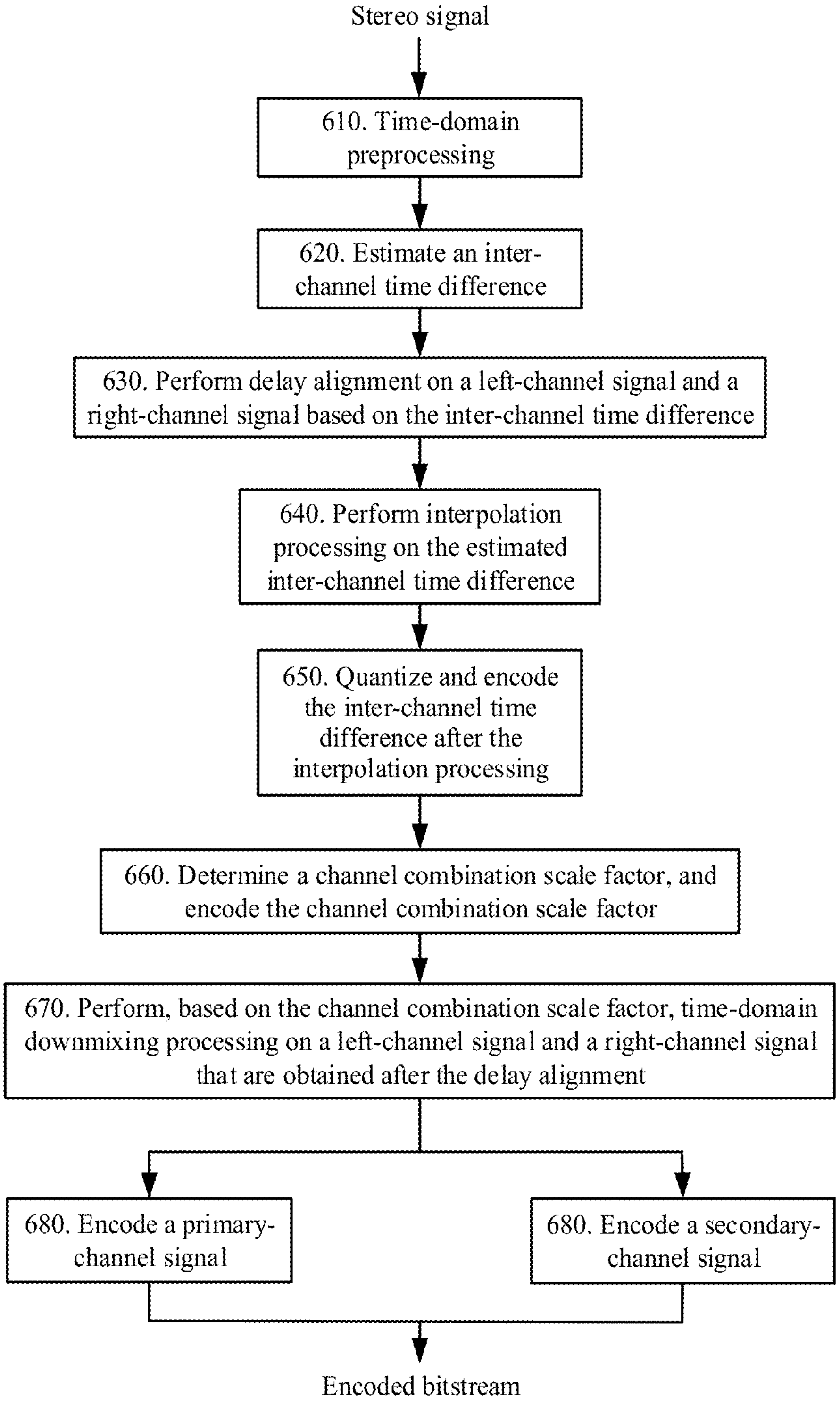
FIG. 6 is a schematic flowchart of an encoding method for a stereo signal according to an embodiment of this disclosure.

FIG. 6 is a schematic flowchart of an encoding method for a stereo signal according to an embodiment of this disclosure. The method 600 may be executed by an encoding end, and the encoding end may be an encoder or a device having a function of encoding a channel signal. The method 600 specifically includes the following steps.

610. Perform time-domain preprocessing on a stereo signal, to obtain a left-channel signal and a right-channel signal after the preprocessing.

Specifically, the time-domain preprocessing on the stereo signal may be implemented by using high-pass filtering, pre-emphasis processing, or the like.

620. Perform delay estimation based the left-channel signal and the right-channel signal after the preprocessing in the current frame, to obtain an estimated inter-channel time difference in the current frame.

The estimated inter-channel time difference in the current frame is equivalent to the inter-channel time difference in the current frame in the method 400.

630. Perform delay alignment on the left-channel signal and the right-channel signal based on the estimated inter-channel time difference in the current frame, to obtain a stereo signal after the delay alignment.

640. Perform interpolation processing on the estimated inter-channel time difference.

An inter-channel time difference after the interpolation processing is equivalent to the inter-channel time difference after the interpolation processing in the current frame in the foregoing description.

650. Quantize the inter-channel time difference after the interpolation processing.

660. Determine a channel combination scale factor based on the stereo signal after the delay alignment, and quantize the channel combination scale factor.

670. Perform, based on the channel combination scale factor, time-domain downmixing processing on a left-channel signal and a right-channel signal that are obtained after the delay alignment, to obtain a primary-channel signal and a secondary-channel signal.

680. Encode, by using a monophonic signal encoding and decoding method, the primary-channel signal and the secondary-channel signal that are obtained after the time-domain downmixing processing.

The foregoing describes in detail the encoding method for a stereo signal in the embodiments of this disclosure with reference to FIG. 4 to FIG. 6. It should be understood that, a decoding method corresponding to the encoding method for a stereo signal in the embodiments described with reference to FIG. 4 and FIG. 6 in this disclosure may be an existing decoding method for a stereo signal. Specifically, the decoding method corresponding to the encoding method for a stereo signal in the embodiments described with reference to FIG. 4 and FIG. 6 in this disclosure may be the decoding method 200 shown in FIG. 2.

Figure 7:
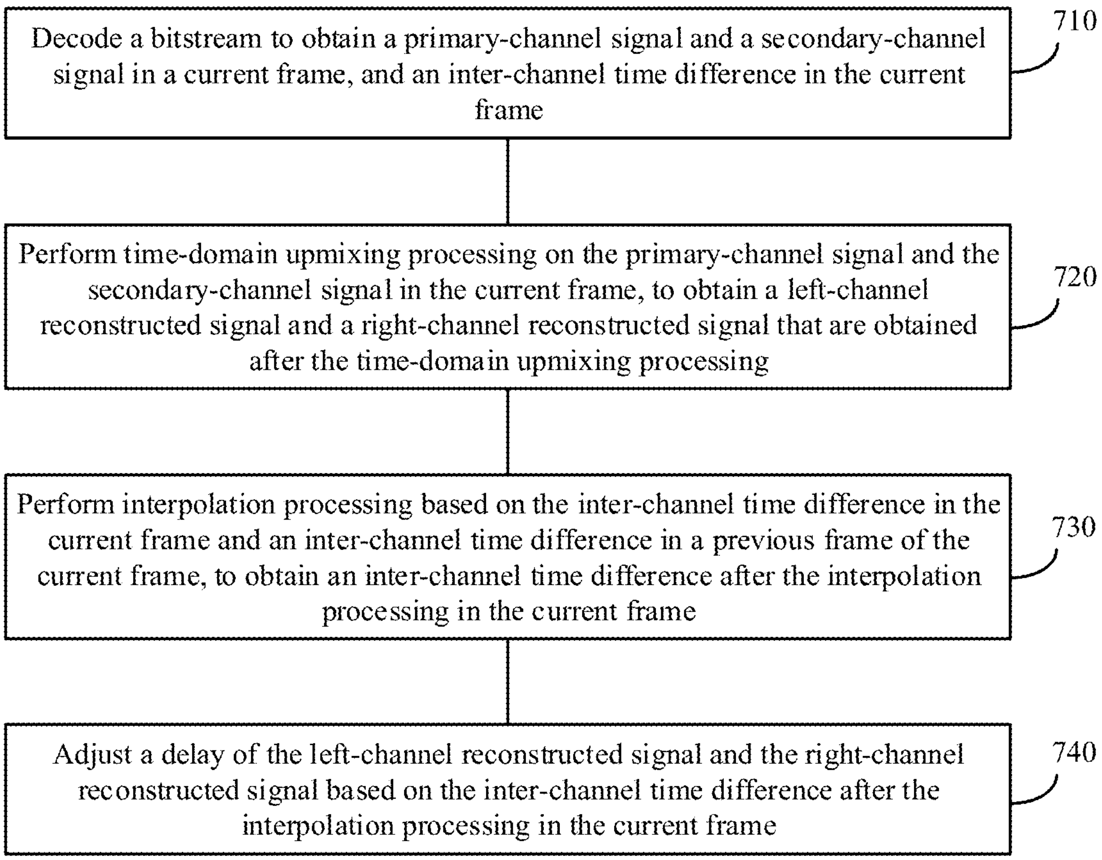
FIG. 7 is a schematic flowchart of a decoding method for a stereo signal according to an embodiment of this disclosure.
Figure 8:
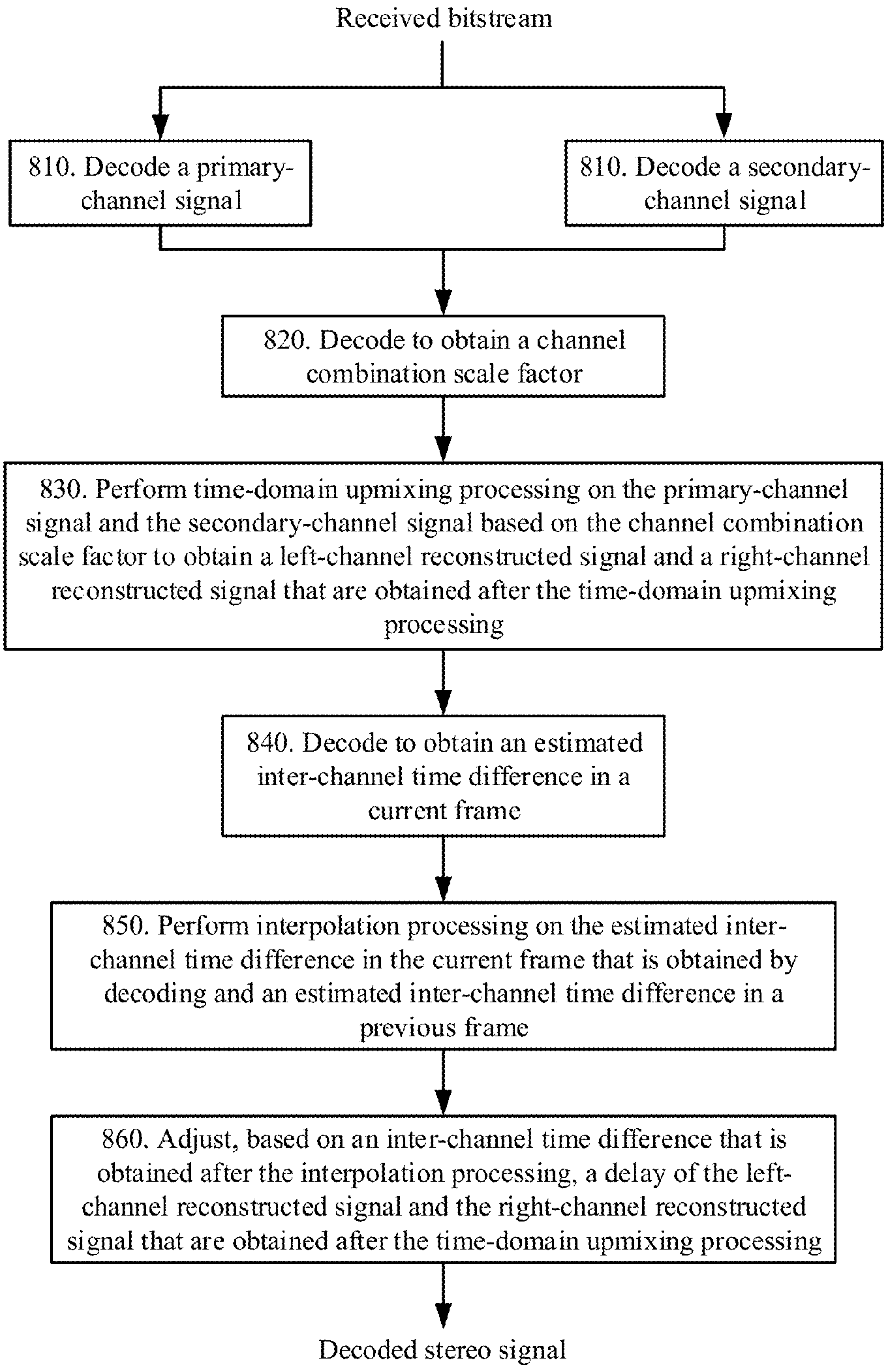
FIG. 8 is a schematic flowchart of a decoding method for a stereo signal according to an embodiment of this disclosure.

The following describes in detail the decoding method for a stereo signal in the embodiments of this disclosure with reference to FIG. 7 and FIG. 8. It should be understood that, an encoding method corresponding to the decoding method for a stereo signal in the embodiments described with reference to FIG. 7 and FIG. 8 in this disclosure may be an existing encoding method for a stereo signal, but cannot be the encoding method for a stereo signal in the embodiments described with reference to FIG. 4 and FIG. 6 in this disclosure.

FIG. 7 is a schematic flowchart of a decoding method for a stereo signal according to an embodiment of this disclosure. The method 700 may be executed by a decoding end, and the decoding end may be a decoder or a device having a function of decoding a stereo signal. The method 700 specifically includes the following steps.

710. Decode a bitstream to obtain a primary-channel signal and a secondary-channel signal in a current frame, and an inter-channel time difference in the current frame.

It should be understood that, in the step 710, a method for decoding the primary-channel signal needs to correspond to a method for encoding the primary-channel signal by an encoding end. Similarly, a method for decoding the secondary channel also needs to correspond to a method for encoding the secondary-channel signal by the encoding end.

Optionally, the bitstream in the step 710 may be a bitstream received by the decoding end.

It should be understood that a stereo signal processed herein may include a left-channel signal and a right-channel signal, and the inter-channel time difference in the current frame may be obtained by estimating, by the encoding end, a delay of the left-channel signal and the right-channel signal, and then the inter-channel time difference in the current frame is quantized before being transmitted to the decoding end (the inter-channel time difference in the current frame may be specifically determined after the decoding end decodes the received bitstream). For example, the encoding end calculates a cross-correlation function of a left channel and a right channel based on a left-channel signal and a right-channel signal in the current frame, then uses an index value corresponding to a maximum value of the cross-correlation function as the inter-channel time difference in the current frame, quantizes and encodes the inter-channel time difference in the current frame, and transmits a quantized inter-channel time difference to the decoding end. The decoding end decodes the received bitstream to determine the inter-channel time difference in the current frame. A specific manner in which the encoding end estimates the delay of the left-channel signal and the right-channel signal may be shown by the example 1 to the example 3 in the foregoing description.

720. Perform time-domain upmixing processing on the primary-channel signal and the secondary-channel signal in the current frame, to obtain a left-channel reconstructed signal and a right-channel reconstructed signal that are obtained after the time-domain upmixing processing.

Specifically, time-domain upmixing processing may be performed, based on a channel combination scale factor, on the primary-channel signal and the secondary-channel signal in the current frame that are obtained by decoding, to obtain the left-channel reconstructed signal and the right-channel reconstructed signal that are obtained after the time-domain upmixing processing (which may also be referred to as a left-channel signal and a right-channel signal that are obtained after the time-domain upmixing processing).

It should be understood that the encoding end and the decoding end may use many methods to perform time-domain downmixing processing and time-domain upmixing processing respectively. However, a method for performing time-domain upmixing processing by the decoding end needs to correspond to a method for performing time-domain downmixing processing by the encoding end. For example, when the encoding end obtains the primary-channel signal and the secondary-channel signal according to the formula (12), the decoding end may first obtain the channel combination scale factor by decoding the received bitstream, and then obtain the left-channel signal and the right-channel signal that are obtained after the time-domain upmixing processing according to a formula (13).

$$\begin{bmatrix} \hat{x}'_L(n) \\ \hat{x}'_R(n) \end{bmatrix} = \frac{1}{\text{ratio}^2 + (1-\text{ratio})^2} * \begin{bmatrix} \text{ratio} & 1-\text{ratio} \\ 1-\text{ratio} & -\text{ratio} \end{bmatrix} * \begin{bmatrix} \hat{Y}(n) \\ \hat{X}(n) \end{bmatrix} \quad (13)$$

In the formula (13), $x'_L(n)$ the left-channel signal after the time-domain upmixing processing in the current frame, $x'_R(n)$ is the right-channel signal after the time-domain upmixing processing in the current frame, Y (n) is the primary-channel signal in the current frame that is obtained by decoding, X (n) is the secondary-channel signal in the current frame that is obtained by decoding, n is a sampling point number, n=0, 1, . . . , N−1, N is a frame length, and ratio is the channel combination scale factor that is obtained by decoding.

730. Perform interpolation processing based on the inter-channel time difference in the current frame and an inter-channel time difference in a previous frame of the current frame, to obtain an inter-channel time difference after the interpolation processing in the current frame.

In the step 730, performing interpolation processing based on the inter-channel time difference in the current frame and the inter-channel time difference in the previous frame of the current frame is equivalent to performing weighted average processing on the inter-channel time difference in the current frame and the inter-channel time difference in the previous frame of the current frame. In this way, the finally obtained inter-channel time difference after the interpolation processing in the current frame is between the inter-channel time difference in the current frame and the inter-channel time difference in the previous frame of the current frame.

In the step 730, the following manner 3 and manner 4 may be used when interpolation processing is performed based on the inter-channel time difference in the current frame and the inter-channel time difference in the previous frame of the current frame.

Manner 3:

The inter-channel time difference after the interpolation processing in the current frame is calculated according to a formula (14).

$$A=\alpha\cdot B+(1-\alpha)\cdot C \quad (14)$$

In the formula (14), A is the inter-channel time difference after the interpolation processing in the current frame, B is the inter-channel time difference in the current frame, C is the inter-channel time difference in the previous frame of the current frame, a is a first interpolation coefficient, and is α real number satisfying $0<\alpha<1$.

The inter-channel time difference can be adjusted by using the formula $A=\alpha\cdot B+(1-\alpha)\cdot C$ so that the finally obtained inter-channel time difference after interpolation processing in the current frame is between the inter-channel time difference in the current frame and the inter-channel time difference in the previous frame of the current frame, and the inter-channel time difference after the interpolation processing in the current frame matches, as much as possible, an inter-channel time difference of an original stereo signal that is not encoded and decoded.

Assuming that the current frame is an $i^{th}$ frame, the previous frame of the current frame is an $(i-1)^{th}$ frame. In this case, the formula (14) may be transformed into a formula (15).

$$d\_\text{int}(i)=\alpha\cdot d(i)+(1-\alpha)\cdot d(i-1) \quad (15)$$

In the formula (15), d_int(i) is an inter-channel time difference after interpolation processing in the $i^{th}$ frame, d(i) is the inter-channel time difference in the current frame, d(i−1) is an inter-channel time difference in the $(i-1)^{th}$ frame.

The first interpolation coefficient α in the formulas (14) and (15) may be directly set by technical personnel (may be directly set according to experience). For example, the first interpolation coefficient α may be directly set to 0.4 or 0.6.

Optionally, the interpolation coefficient α may also be determined based on a frame length of the current frame and an encoding and decoding delay. The encoding and decoding delay herein may include an encoding delay in a process of encoding, by the encoding end, a primary-channel signal and a secondary-channel signal that are obtained after time-domain downmixing processing, and a decoding delay in a process of decoding, by a decoding end, a bitstream to obtain a primary-channel signal and a secondary-channel signal. Further, the encoding and decoding delay herein may be a sum of the encoding delay at the encoding end and the decoding delay at the decoding end.

Optionally, the interpolation coefficient α may be specifically inversely proportional to the encoding and decoding delay, and the first interpolation coefficient α is directly proportional to the frame length of the current frame. In other words, the first interpolation coefficient α decreases as the encoding and decoding delay increases, and increases as the frame length of the current frame increases.

Optionally, the first interpolation coefficient α may be calculated according to a formula (16).

$$\alpha=\frac{N-S}{N} \quad (16)$$

In the formula (16), N is the frame length of the current frame, and S is the encoding and decoding delay.

It is assumed that the frame length of the current frame is 320, and the encoding and decoding delay is 192, in other words, N=320, and S=192. In this case, N and S are substituted into the formula (16) to obtain:

$$\alpha = \frac{N-S}{N} = \frac{320-192}{320} = 0.4 \tag{17}$$

Finally, it can be obtained that the first interpolation coefficient α is 0.4.

Optionally, the first interpolation coefficient α is pre-stored. Specifically, the first interpolation coefficient α may be pre-stored at the decoding end. In this way, when performing interpolation processing, the decoding end may directly perform interpolation processing based on the pre-stored first interpolation coefficient α without calculating a value of the first interpolation coefficient α. This can reduce calculation complexity of a decoding process and improve decoding efficiency.

Manner 4:

The inter-channel time difference after the interpolation processing in the current frame is calculated according to a formula (18).

$$A=(1-\beta)\cdot B+\beta\cdot C \tag{18}$$

In the formula (18), A is the inter-channel time difference after the interpolation processing in the current frame, B is the inter-channel time difference in the current frame, C is the inter-channel time difference in the previous frame of the current frame, and β is a second interpolation coefficient and is a real number satisfying 0<α<1.

The inter-channel time difference can be adjusted by using the formula A=(1−β)·B+β·C, so that the finally obtained inter-channel time difference after interpolation processing in the current frame is between the inter-channel time difference in the current frame and the inter-channel time difference in the previous frame of the current frame, and the inter-channel time difference after the interpolation processing in the current frame matches, as much as possible, an inter-channel time difference of an original stereo signal that is not encoded and decoded.

Assuming that the current frame is an $i^{th}$ frame, the previous frame of the current frame is an $(i-1)^{th}$ frame. In this case, the formula (18) may be transformed into the following formula:

$$d\_int(i)=(1-\beta)\cdot d(i)+\beta\cdot d(i-1) \tag{19}$$

In the formula (15), d_int(i) is an inter-channel time difference after interpolation processing in the $i^{th}$ frame, d(i) is the inter-channel time difference in the current frame, d(i−1) is an inter-channel time difference in the $(i-1)^{th}$ frame.

Similar to the manner for setting the first interpolation coefficient α, the second interpolation coefficient β may also be directly set by technical personnel (may be directly set according to experience). For example, the second interpolation coefficient β may be directly set to 0.6 or 0.4.

Optionally, the second interpolation coefficient β may also be determined based on a frame length of the current frame and an encoding and decoding delay. The encoding and decoding delay herein may include an encoding delay in a process of encoding, by the encoding end, a primary-channel signal and a secondary-channel signal that are obtained after time-domain downmixing processing, and a decoding delay in a process of decoding, by a decoding end, a bitstream to obtain a primary-channel signal and a secondary-channel signal. Further, the encoding and decoding delay herein may be a sum of the encoding delay at the encoding end and the decoding delay at the decoding end.

Optionally, the second interpolation coefficient β may be specifically directly proportional to the encoding and decoding delay, and is inversely proportional to the frame length of the current frame. In other words, the second interpolation coefficient β increases as the encoding and decoding delay increases, and decreases as the frame length of the current frame increases.

Optionally, the second interpolation coefficient β may be determined according to a formula (20).

$$\beta = \frac{S}{N} \tag{20}$$

In the formula (20), N is the frame length of the current frame, and S is the encoding and decoding delay.

It is assumed that N=320, and S=192. In this case, N=320 and S=192 are substituted into the formula (20) to obtain:

$$\beta = \frac{S}{N} = \frac{192}{320} = 0.6 \tag{21}$$

Finally, it can be obtained that the second interpolation coefficient β is 0.6.

Optionally, the second interpolation coefficient β is pre-stored. Specifically, the second interpolation coefficient β may be pre-stored at the decoding end. In this way, when performing interpolation processing, the decoding end may directly perform interpolation processing based on the pre-stored second interpolation coefficient β without calculating a value of the second interpolation coefficient β. This can reduce calculation complexity of a decoding process and improve decoding efficiency.

740. Adjust a delay of the left-channel reconstructed signal and the right-channel reconstructed signal based on the inter-channel time difference in the current frame.

It should be understood that, optionally, the left-channel reconstructed signal and the right-channel reconstructed signal that are obtained after the delay adjustment are decoded stereo signals.

Optionally, after the step 740, the method may further includes obtaining the decoded stereo signals based on the left-channel reconstructed signal and the right-channel reconstructed signal that are obtained after the delay adjustment. For example, de-emphasis processing is performed on the left-channel reconstructed signal and the right-channel reconstructed signal that are obtained after the delay adjustment, to obtain the decoded stereo signals. For another example, post-processing is performed on the left-channel reconstructed signal and the right-channel reconstructed signal that are obtained after the delay adjustment, to obtain the decoded stereo signals.

In this disclosure, by performing interpolation processing on the inter-channel time difference in the current frame and the inter-channel time difference in the previous frame of the current frame, the inter-channel time difference after the interpolation processing in the current frame can match the primary-channel signal and the secondary-channel signal that are obtained by decoding currently. This can reduce a deviation between an inter-channel time difference of a stereo signal that is finally obtained by decoding and an inter-channel time difference of an original stereo signal. Therefore, accuracy of a stereo sound image of the stereo signal that is finally obtained by decoding is improved.

Specifically, a difference between a signal in the stereo signal finally obtained in the method 700 and the same signal in the original stereo signal may be shown in FIG. 5. By comparing FIG. 5 and FIG. 3, it can be found that, in FIG. 5, a delay between the signal in the stereo signal that is finally obtained by decoding and the same signal in the original stereo signal has become very small. Particularly, when the value of the inter-channel time difference changes greatly (as shown by an area in a rectangular frame in FIG. 5), a delay deviation between the channel signal that is finally obtained by the decoding end and the original channel signal is also very small. In other words, according to the decoding method for a stereo signal in this embodiment of this disclosure, a delay deviation between the signal in the stereo signal that is finally obtained by decoding and the same signal in the original stereo signal can be reduced.

It should be understood that the encoding method of the encoding end corresponding to the method 700 may be an existing time-domain stereo encoding method. For example, the time-domain stereo encoding method corresponding to the method 700 may be the method 100 shown in FIG. 1.

A detailed process of the decoding method for a stereo signal in the embodiments of this disclosure is described below with reference to FIG. 8.

FIG. 8 is a schematic flowchart of a decoding method for a stereo signal according to an embodiment of this disclosure. The method 800 may be executed by a decoding end, and the decoding end may be a decoder or a device having a function of decoding a channel signal. The method 800 specifically includes the following steps.

810. Decode a primary-channel signal and a secondary-channel signal respectively based on a received bitstream.

Specifically, a decoding method for decoding the primary-channel signal by the decoding end corresponds to an encoding method for encoding the primary-channel signal by an encoding end. A decoding method for decoding the secondary-channel signal by the decoding end corresponds to an encoding method for encoding the secondary-channel signal by the encoding end.

820. Decode the received bitstream to obtain a channel combination scale factor.

Specifically, the received bitstream may be decoded to obtain an encoding index of the channel combination scale factor, and then the channel combination scale factor is obtained by decoding based on the obtained encoding index of the channel combination scale factor.

830. Perform time-domain upmixing processing on the primary-channel signal and the secondary-channel signal based on the channel combination scale factor, to obtain a left-channel reconstructed signal and a right-channel reconstructed signal that are obtained after the time-domain upmixing processing.

840. Decode the received bitstream to obtain an inter-channel time difference in a current frame.

850. Perform interpolation processing based on the inter-channel time difference in the current frame that is obtained by decoding and an inter-channel time difference in a previous frame of the current frame, to obtain an inter-channel time difference after the interpolation processing in the current frame.

860. Adjust, based on the inter-channel time difference after the interpolation processing, a delay of the left-channel reconstructed signal and the right-channel reconstructed signal that are obtained after the time-domain upmixing processing, to obtain a decoded stereo signal.

It should be understood that, in this disclosure, the process of performing interpolation processing based on the inter-channel time difference in the current frame and the inter-channel time difference in the previous frame may be performed at the encoding end or the decoding end. After interpolation processing is performed at the encoding end based on the inter-channel time difference in the current frame and the inter-channel time difference in the previous frame, interpolation processing does not need to be performed at the decoding end, the inter-channel time difference after the interpolation processing in the current frame may be obtained directly based on the bitstream, and subsequent delay adjustment is performed based on the inter-channel time difference after the interpolation processing in the current frame. However, when interpolation processing is not performed at the encoding end, the decoding end needs to perform interpolation processing based on the inter-channel time difference in the current frame and the inter-channel time difference in the previous frame, and then performs subsequent delay adjustment based on the inter-channel time difference after the interpolation processing in the current frame that is obtained through the interpolation processing.

The foregoing describes in detail the encoding and decoding methods for a stereo signal in the embodiments of this disclosure with reference to FIG. 1 to FIG. 8. The following describes the encoding and decoding apparatuses for a stereo signal in embodiments of this disclosure with reference to FIG. 9 to FIG. 12. It should be understood that the encoding apparatus in FIG. 9 to FIG. 12 is corresponding to the encoding method for a stereo signal in the embodiments of this disclosure, and the encoding apparatus may perform the encoding method for a stereo signal in the embodiments of this disclosure. The decoding apparatus in FIG. 9 to FIG. 12 is corresponding to the decoding method for a stereo signal in the embodiments of this disclosure, and the decoding apparatus may perform the decoding method for a stereo signal in the embodiments of this disclosure. For brevity, repeated descriptions are appropriately omitted below.

Figure 9:
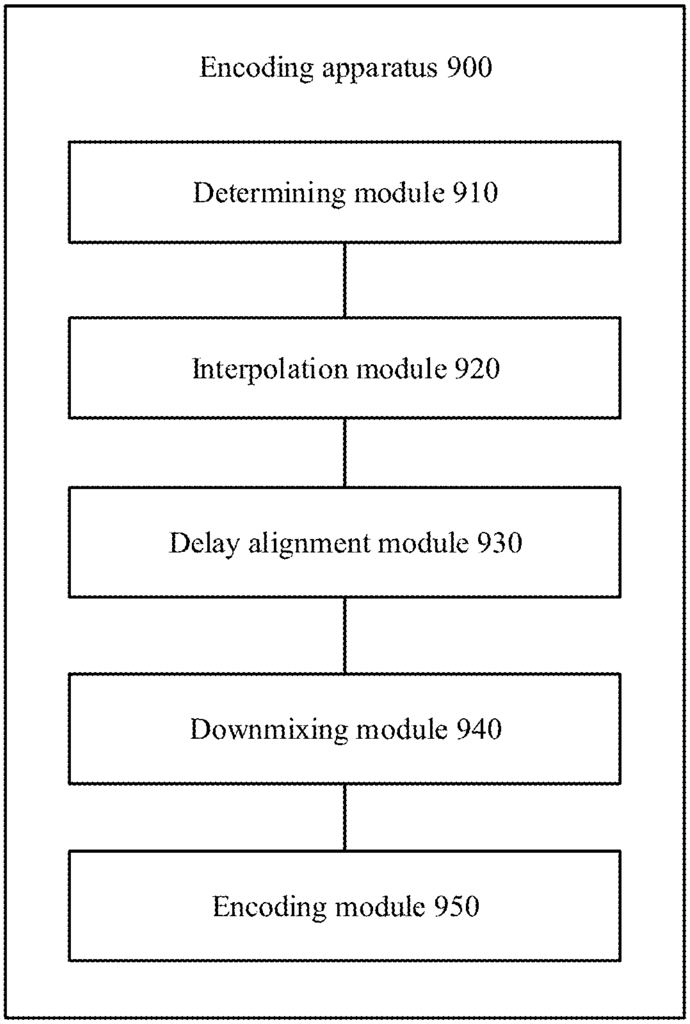
FIG. 9 is a schematic block diagram of an encoding apparatus according to an embodiment of this disclosure.

FIG. 9 is a schematic block diagram of an encoding apparatus according to an embodiment of this disclosure. The encoding apparatus 900 shown in FIG. 9 includes:

a determining module 910, configured to determine an inter-channel time difference in a current frame;

an interpolation module 920, configured to perform interpolation processing based on the inter-channel time difference in the current frame and an inter-channel time difference in a previous frame of the current frame, to obtain an inter-channel time difference after the interpolation processing in the current frame;

a delay alignment module 930, configured to perform delay alignment on a stereo signal in the current frame based on the inter-channel time difference in the current frame, to obtain a stereo signal after the delay alignment in the current frame;

a downmixing module 940, configured to perform time-domain downmixing processing on the stereo signal after the delay alignment in the current frame, to obtain a primary-channel signal and a secondary-channel signal in the current frame; and an encoding module 950, configured to quantize the inter-channel time difference after the interpolation processing in the current frame, and write a quantized inter-channel time difference into a bitstream.

The encoding module 950 is further configured to quantize the primary-channel signal and the secondary-channel signal in the current frame, and write a quantized primary-channel signal and a quantized secondary-channel signal into the bitstream.

In this disclosure, the inter-channel time difference in the current frame is used at the encoding apparatus to perform delay alignment, to obtain the primary-channel signal and the secondary-channel signal. However, interpolation processing is performed on the inter-channel time difference in the current frame and the inter-channel time difference in the previous frame of the current frame, so that the inter-channel time difference in the current frame that is obtained after the interpolation processing can match the primary-channel signal and the secondary-channel signal that are obtained by encoding and decoding. The inter-channel time difference after the interpolation processing is encoded and then transmitted to the decoding end, so that the decoding end can perform decoding based on the inter-channel time difference in the current frame that matches the primary-channel signal and the secondary-channel signal that are obtained by decoding. This can reduce a deviation between an inter-channel time difference of a stereo signal that is finally obtained by decoding and an inter-channel time difference of an original stereo signal. Therefore, accuracy of a stereo sound image of the stereo signal that is finally obtained by decoding is improved.

Optionally, in an embodiment, the inter-channel time difference after the interpolation processing in the current frame is calculated according to a formula $A=\alpha\cdot B+(1-a)\cdot C$ where A is the inter-channel time difference after the interpolation processing in the current frame, B is the inter-channel time difference in the current frame, C is the inter-channel time difference in the previous frame of the current frame, a is a first interpolation coefficient, and $0<\alpha<1$.

Optionally, in an embodiment, the first interpolation coefficient $\alpha$ is inversely proportional to an encoding and decoding delay, and is directly proportional to a frame length of the current frame, where the encoding and decoding delay includes an encoding delay in a process of encoding, by an encoding end, a primary-channel signal and a secondary-channel signal that are obtained after time-domain downmixing processing, and a decoding delay in a process of decoding, by a decoding end, a bitstream to obtain a primary-channel signal and a secondary-channel signal.

Optionally, in an embodiment, the first interpolation coefficient $\alpha$ satisfies a formula $\alpha=(N-S)/N$, where S is the encoding and decoding delay, and N is the frame length of the current frame.

Optionally, in an embodiment, the first interpolation coefficient $\alpha$ is pre-stored.

Optionally, in an embodiment, the inter-channel time difference after the interpolation processing in the current frame is calculated according to a formula $A=(1-\beta)\cdot B+\beta\cdot C$.

In the formula, A is the inter-channel time difference after the interpolation processing in the current frame, B is the inter-channel time difference in the current frame, C is the inter-channel time difference in the previous frame of the current frame, $\beta$ is a second interpolation coefficient, and $0<\beta<1$.

Optionally, in an embodiment, the second interpolation coefficient $\beta$ is directly proportional to an encoding and decoding delay, and is inversely proportional to a frame length of the current frame, where the encoding and decoding delay includes an encoding delay in a process of encoding, by an encoding end, a primary-channel signal and a secondary-channel signal that are obtained after time-domain downmixing processing, and a decoding delay in a process of decoding, by a decoding end, a bitstream to obtain a primary-channel signal and a secondary-channel signal.

Optionally, in an embodiment, the second interpolation coefficient $\beta$ satisfies a formula $\beta=S/N$, where S is the encoding and decoding delay, and N is the frame length of the current frame.

Optionally, in an embodiment, the second interpolation coefficient $\beta$ is pre-stored.

Figure 10:
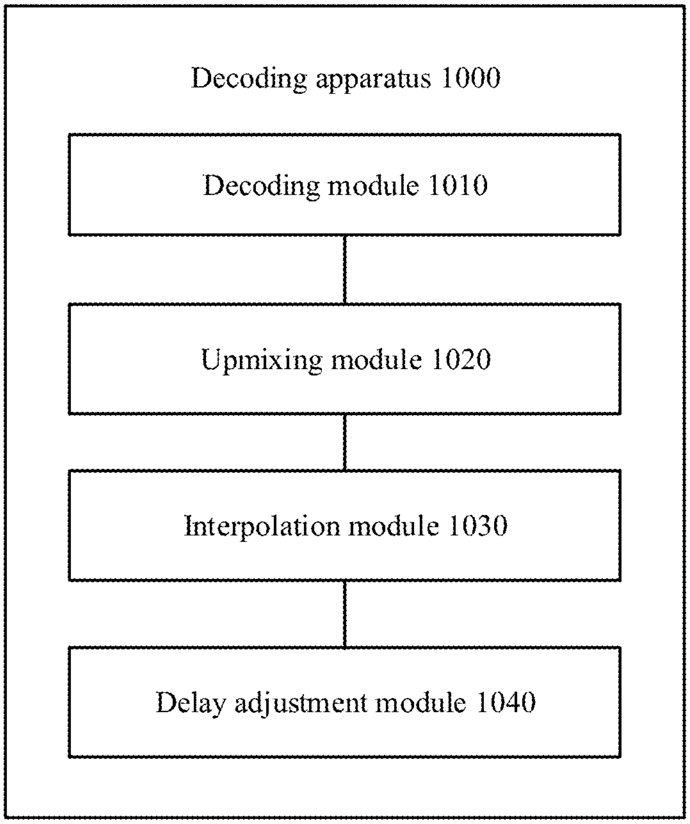
FIG. 10 is a schematic block diagram of a decoding apparatus according to an embodiment of this disclosure.

FIG. 10 is a schematic block diagram of a decoding apparatus according to an embodiment of this disclosure. The decoding apparatus 1000 shown in FIG. 10 includes:

- a decoding module 1010, configured to decode a bitstream to obtain a primary-channel signal and a secondary-channel signal in a current frame, and an inter-channel time difference in the current frame;
- an upmixing module 1020, configured to perform time-domain upmixing processing on the primary-channel signal and the secondary-channel signal in the current frame, to obtain a primary-channel signal and a secondary-channel signal that are obtained after the time-domain upmixing processing;
- an interpolation module 1030, configured to perform interpolation processing based on the inter-channel time difference in the current frame and an inter-channel time difference in a previous frame of the current frame, to obtain an inter-channel time difference after the interpolation processing in the current frame; and
- a delay adjustment module 1040, configured to adjust, based on the inter-channel time difference after the interpolation processing in the current frame, a delay of the primary-channel signal and the secondary-channel signal that are obtained after the time-domain upmixing processing.

In this disclosure, by performing interpolation processing on the inter-channel time difference in the current frame and the inter-channel time difference in the previous frame of the current frame, the inter-channel time difference after the interpolation processing in the current frame can match the primary-channel signal and the secondary-channel signal that are obtained by decoding currently. This can reduce a deviation between an inter-channel time difference of a stereo signal that is finally obtained by decoding and an inter-channel time difference of an original stereo signal. Therefore, accuracy of a stereo sound image of the stereo signal that is finally obtained by decoding is improved.

Optionally, in an embodiment, the inter-channel time difference after the interpolation processing in the current frame is calculated according to a formula $A=\alpha\cdot B+(1-\alpha)\cdot C$ where A is the inter-channel time difference after the interpolation processing in the current frame, B is the inter-channel time difference in the current frame, C is the inter-channel time difference in the previous frame of the current frame, a is a first interpolation coefficient, and $0<\alpha<1$.

Optionally, in an embodiment, the first interpolation coefficient $\alpha$ is inversely proportional to an encoding and decoding delay, and is directly proportional to a frame length of the current frame, where the encoding and decoding delay includes an encoding delay in a process of encoding, by an encoding end, a primary-channel signal and a secondary-channel signal that are obtained after time-domain downmixing processing, and a decoding delay in a process of decoding, by a decoding end, a bitstream to obtain a primary-channel signal and a secondary-channel signal.

Optionally, in an embodiment, the first interpolation coefficient $\alpha$ satisfies a formula $\alpha=(N-S)/N$, where S is the encoding and decoding delay, and N is the frame length of the current frame.

Optionally, in an embodiment, the first interpolation coefficient $\alpha$ is pre-stored.

Optionally, in an embodiment, the inter-channel time difference after the interpolation processing in the current frame is calculated according to a formula $A=(1-\beta)\cdot B+\beta\cdot C$ where A is the inter-channel time difference after the interpolation processing in the current frame, B is the inter-channel time difference in the current frame, C is the inter-channel time difference in the previous frame of the current frame, B is a second interpolation coefficient, and $0<\beta<1$.

Optionally, in an embodiment, the second interpolation coefficient $\beta$ is directly proportional to an encoding and decoding delay, and is inversely proportional to a frame length of the current frame, where the encoding and decoding delay includes an encoding delay in a process of encoding, by an encoding end, a primary-channel signal and a secondary-channel signal that are obtained after time-domain downmixing processing, and a decoding delay in a process of decoding, by a decoding end, a bitstream to obtain a primary-channel signal and a secondary-channel signal.

Optionally, in an embodiment, the second interpolation coefficient $\beta$ satisfies a formula $\beta=S/N$, where S is the encoding and decoding delay, and N is the frame length of the current frame.

Optionally, in an embodiment, the second interpolation coefficient $\beta$ is pre-stored.

Figure 11:
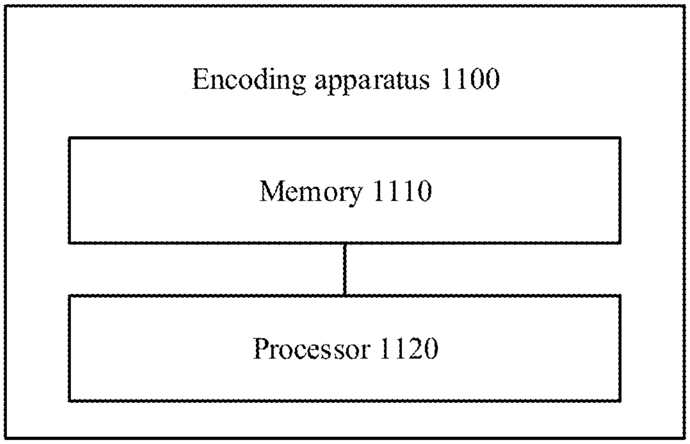
FIG. 11 is a schematic block diagram of an encoding apparatus according to an embodiment of this disclosure.

FIG. 11 is a schematic block diagram of an encoding apparatus according to an embodiment of this disclosure. The encoding apparatus 1100 shown in FIG. 11 includes:

a memory 1110, configured to store a program; and a processor 1120, configured to execute the program stored in the memory 1110, where when the program in the memory 1110 is executed, the processor 1120 is specifically configured to: perform interpolation processing based on an inter-channel time difference in a current frame and an inter-channel time difference in a previous frame of the current frame, to obtain an inter-channel time difference after the interpolation processing in the current frame; perform delay alignment on a stereo signal in the current frame based on the inter-channel time difference in the current frame, to obtain a stereo signal after the delay alignment in the current frame; perform time-domain downmixing processing on the stereo signal after the delay alignment in the current frame, to obtain a primary-channel signal and a secondary-channel signal in the current frame; quantize the inter-channel time difference after the interpolation processing in the current frame, and write a quantized inter-channel time difference into a bitstream; and quantize the primary-channel signal and the secondary-channel signal in the current frame, and write a quantized primary-channel signal and a quantized secondary-channel signal into the bitstream.

In this disclosure, the inter-channel time difference in the current frame is used at the encoding apparatus to perform delay alignment, to obtain the primary-channel signal and the secondary-channel signal. However, interpolation processing is performed on the inter-channel time difference in the current frame and the inter-channel time difference in the previous frame of the current frame, so that the inter-channel time difference in the current frame that is obtained after the interpolation processing can match the primary-channel signal and the secondary-channel signal that are obtained by encoding and decoding. The inter-channel time difference after the interpolation processing is encoded and then transmitted to the decoding end, so that the decoding end can perform decoding based on the inter-channel time difference in the current frame that matches the primary-channel signal and the secondary-channel signal that are obtained by decoding. This can reduce a deviation between an inter-channel time difference of a stereo signal that is finally obtained by decoding and an inter-channel time difference of an original stereo signal. Therefore, accuracy of a stereo sound image of the stereo signal that is finally obtained by decoding is improved.

Optionally, in an embodiment, the inter-channel time difference after the interpolation processing in the current frame is calculated according to a formula $A=\alpha\cdot B+(1-\alpha)\cdot C$, where A is the inter-channel time difference after the interpolation processing in the current frame, B is the inter-channel time difference in the current frame, C is the inter-channel time difference in the previous frame of the current frame, a is a first interpolation coefficient, and $0<\alpha<1$.

Optionally, in an embodiment, the first interpolation coefficient $\alpha$ is inversely proportional to an encoding and decoding delay, and is directly proportional to a frame length of the current frame, where the encoding and decoding delay includes an encoding delay in a process of encoding, by an encoding end, a primary-channel signal and a secondary-channel signal that are obtained after time-domain downmixing processing, and a decoding delay in a process of decoding, by a decoding end, a bitstream to obtain a primary-channel signal and a secondary-channel signal.

Optionally, in an embodiment, the first interpolation coefficient $\alpha$ satisfies $\alpha$ formula $\alpha=(N-S)/N$, where S is the encoding and decoding delay, and N is the frame length of the current frame.

Optionally, in an embodiment, the first interpolation coefficient $\alpha$ is pre-stored.

The first interpolation coefficient $\alpha$ may be stored in the memory 1110.

Optionally, in an embodiment, the inter-channel time difference after the interpolation processing in the current frame is calculated according to a formula $A=(1-\beta)\cdot B+\beta\cdot C$.

In the formula, A is the inter-channel time difference after the interpolation processing in the current frame, B is the inter-channel time difference in the current frame, C is the inter-channel time difference in the previous frame of the current frame, $\beta$ is a second interpolation coefficient, and $0<\beta<1$.

Optionally, in an embodiment, the second interpolation coefficient $\beta$ is directly proportional to an encoding and decoding delay, and is inversely proportional to a frame length of the current frame, where the encoding and decoding delay includes an encoding delay in a process of encoding, by an encoding end, a primary-channel signal and a secondary-channel signal that are obtained after time-domain downmixing processing, and a decoding delay in a process of decoding, by a decoding end, a bitstream to obtain a primary-channel signal and a secondary-channel signal.

Optionally, in an embodiment, the second interpolation coefficient $\beta$ satisfies a formula $\beta=S/N$, where S is the encoding and decoding delay, and N is the frame length of the current frame.

Optionally, in an embodiment, the second interpolation coefficient $\beta$ is pre-stored.

The second interpolation coefficient $\beta$ may be stored in the memory 1110.

Figure 12:
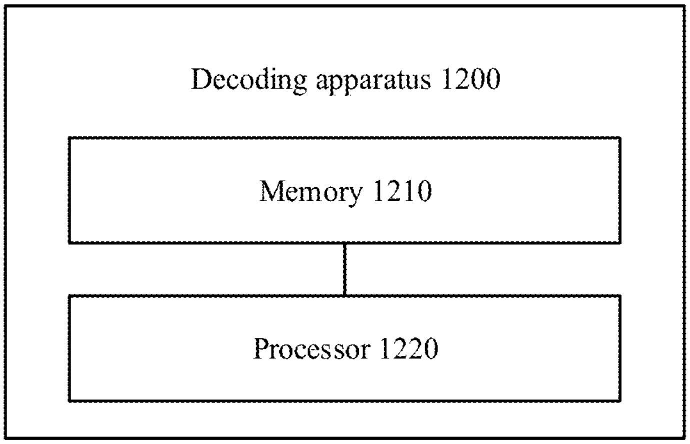
FIG. 12 is a schematic block diagram of a decoding apparatus according to an embodiment of this disclosure.

FIG. 12 is a schematic block diagram of a decoding apparatus according to an embodiment of this disclosure. The decoding apparatus 1200 shown in FIG. 12 includes:

a memory 1210, configured to store a program; and a processor 1220, configured to execute the program stored in the memory 1210, where when the program in the memory 1210 is executed, the processor 1220 is specifically configured to: decode a bitstream to obtain a primary-channel signal and a secondary-channel signal in a current frame; perform time-domain upmixing processing on the primary-channel signal and the secondary-channel signal in the current frame, to obtain a primary-channel signal and a secondary-channel signal that are obtained after the time-domain upmixing processing; perform interpolation processing based on an inter-channel time difference in the current frame and an inter-channel time difference in a previous frame of the current frame, to obtain an inter-channel time difference after the interpolation processing in the current frame; and adjust, based on the inter-channel time difference after the interpolation processing in the current frame, a delay of the primary-channel signal and the secondary-channel signal that are obtained after the time-domain upmixing processing.

In this disclosure, by performing interpolation processing on the inter-channel time difference in the current frame and the inter-channel time difference in the previous frame of the current frame, the inter-channel time difference after the interpolation processing in the current frame can match the primary-channel signal and the secondary-channel signal that are obtained by decoding currently. This can reduce a deviation between an inter-channel time difference of a stereo signal that is finally obtained by decoding and an inter-channel time difference of an original stereo signal. Therefore, accuracy of a stereo sound image of the stereo signal that is finally obtained by decoding is improved.

Optionally, in an embodiment, the inter-channel time difference after the interpolation processing in the current frame is calculated according to a formula $A=\alpha\cdot B+(1-\alpha)\cdot C$, where A is the inter-channel time difference after the interpolation processing in the current frame, B is the inter-channel time difference in the current frame, C is the inter-channel time difference in the previous frame of the current frame, a is a first interpolation coefficient, and $0<\alpha<1$.

Optionally, in an embodiment, the first interpolation coefficient $\alpha$ is inversely proportional to an encoding and decoding delay, and is directly proportional to a frame length of the current frame, where the encoding and decoding delay includes an encoding delay in a process of encoding, by an encoding end, a primary-channel signal and a secondary-channel signal that are obtained after time-domain downmixing processing, and a decoding delay in a process of decoding, by a decoding end, a bitstream to obtain a primary-channel signal and a secondary-channel signal.

Optionally, in an embodiment, the first interpolation coefficient $\alpha$ satisfies a formula $\alpha=(N-S)/N$, where S is the encoding and decoding delay, and N is the frame length of the current frame.

Optionally, in an embodiment, the first interpolation coefficient $\alpha$ is pre-stored.

The first interpolation coefficient $\alpha$ may be stored in the memory 1210.

Optionally, in an embodiment, the inter-channel time difference after the interpolation processing in the current frame is calculated according to a formula $A=(1-\beta)\cdot B+\beta\cdot C$, where A is the inter-channel time difference after the interpolation processing in the current frame, B is the inter-channel time difference in the current frame, C is the inter-channel time difference in the previous frame of the current frame, B is a second interpolation coefficient, and $0<\beta<1$.

Optionally, in an embodiment, the second interpolation coefficient $\beta$ is directly proportional to an encoding and decoding delay, and is inversely proportional to a frame length of the current frame, where the encoding and decoding delay includes an encoding delay in a process of encoding, by an encoding end, a primary-channel signal and a secondary-channel signal that are obtained after time-domain downmixing processing, and a decoding delay in a process of decoding, by a decoding end, a bitstream to obtain a primary-channel signal and a secondary-channel signal.

Optionally, in an embodiment, the second interpolation coefficient $\beta$ satisfies a formula $\beta=S/N$, where S is the encoding and decoding delay, and N is the frame length of the current frame.

Optionally, in an embodiment, the second interpolation coefficient $\beta$ is pre-stored.

The second interpolation coefficient $\beta$ may be stored in the memory 1210.

Figure 13:
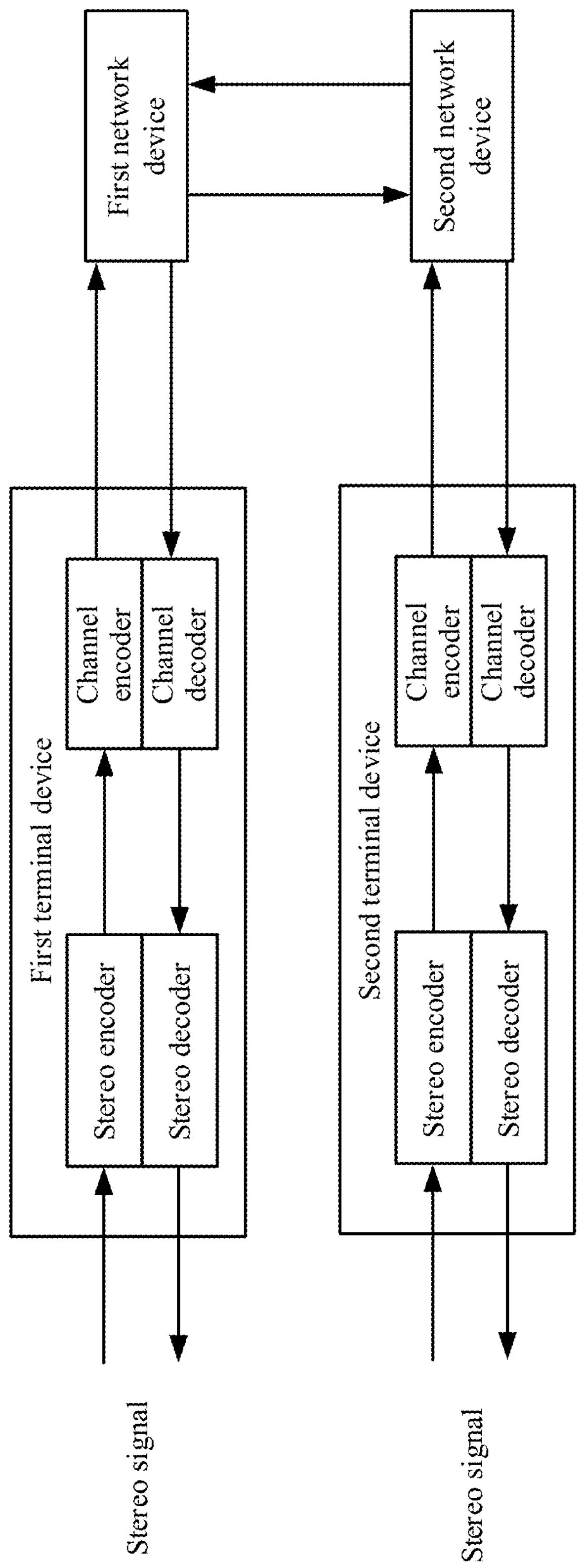
FIG. 13 is a schematic diagram of a terminal device according to an embodiment of this disclosure.
Figure 14:
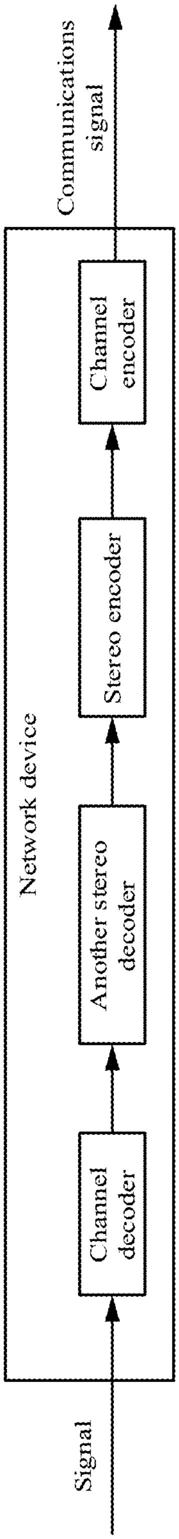
FIG. 14 is a schematic diagram of a network device according to an embodiment of this disclosure.
Figure 15:
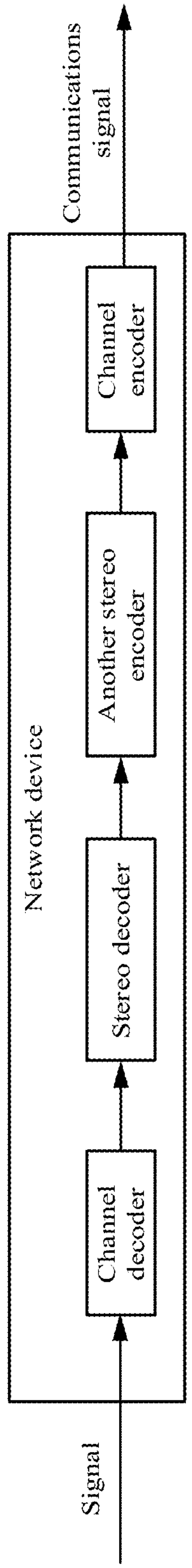
FIG. 15 is a schematic diagram of a network device according to an embodiment of this disclosure.

It should be understood that the encoding and decoding methods for a stereo signal in the embodiments of this disclosure may be performed by a terminal device or a network device in FIG. 13 to FIG. 15. In addition, the encoding and decoding apparatuses in the embodiments of this disclosure may be further disposed in the terminal device or the network device in FIG. 13 to FIG. 15. Specifically, the encoding apparatus in the embodiments of this disclosure may be a stereo encoder in the terminal device or the network device in FIG. 13 to FIG. 15, and the decoding apparatus in the embodiments of this disclosure may be a stereo decoder in the terminal device or the network device in FIG. 13 to FIG. 15.

As shown in FIG. 13, in audio communication, a stereo encoder in a first terminal device performs stereo encoding on a collected stereo signal, and a channel encoder in the first terminal device may perform channel encoding on a bitstream obtained by the stereo encoder. Next, data obtained by the first terminal device after the channel encoding is transmitted to a second terminal device by using a first network device and a second network device. After the second terminal device receives the data from the second network device, a channel decoder in the second terminal device performs channel decoding, to obtain a stereo signal encoded bitstream. A stereo decoder in the second terminal device then restores a stereo signal by decoding, and the terminal device plays back the stereo signal. In this way, audio communication is completed between different terminal devices.

It should be understood that, in FIG. 13, the second terminal device may also encode a collected stereo signal, and finally transmits, by using the second network device and the first network device, data that is finally obtained by encoding to the first terminal device. The first terminal device performs channel decoding and stereo decoding on the data to obtain a stereo signal.

In FIG. 13, the first network device and the second network device may be wireless network communications devices or wired network communications devices. The first network device and the second network device may communicate with each other by using a digital channel.

The first terminal device or the second terminal device in FIG. 13 may perform the encoding and decoding methods for a stereo signal in the embodiments of this disclosure. The encoding and decoding apparatuses in the embodiments of this disclosure may be respectively the stereo encoder and the stereo decoder in the first terminal device or the second terminal device.

In audio communication, a network device may implement transcoding of an encoding and decoding format of an audio signal. As shown in FIG. 14, if an encoding and decoding format of a signal received by a network device is an encoding and decoding format corresponding to another stereo decoder, a channel decoder in the network device performs channel decoding on the received signal, to obtain an encoded bitstream corresponding to the another stereo decoder. The another stereo decoder decodes the encoded bitstream, to obtain a stereo signal. A stereo encoder encodes the stereo signal to obtain an encoded bitstream of the stereo signal. Finally, a channel encoder performs channel encoding on the encoded bitstream of the stereo signal, to obtain a final signal (the signal may be transmitted to a terminal device or another network device). It should be understood that an encoding and decoding format corresponding to the stereo encoder in FIG. 14 is different from the encoding and decoding format corresponding to the another stereo decoder. It is assumed that the encoding and decoding format corresponding to the another stereo decoder is a first encoding and decoding format, and the encoding and decoding format corresponding to the stereo encoder is a second encoding and decoding format. In FIG. 14, the network device converts the audio signal from the first encoding and decoding format to the second encoding and decoding format.

Similarly, as shown in FIG. 15, if an encoding and decoding format of a signal received by a network device is the same as an encoding and decoding format corresponding to a stereo decoder, after a channel decoder of the network device performs channel decoding to obtain an encoded bitstream of a stereo signal, the stereo decoder may decode the encoded bitstream of the stereo signal, to obtain a stereo signal. Next, another stereo encoder encodes the stereo signal based on another encoding and decoding format to obtain an encoded bitstream corresponding to the another stereo encoder. Finally, a channel encoder performs channel encoding on the encoded bitstream corresponding to the another stereo encoder, to obtain a final signal (the signal may be transmitted to a terminal device or another network device). Same as the case in FIG. 14, the encoding and decoding format corresponding to the stereo decoder in FIG. 15 is also different from the encoding and decoding format corresponding to the another stereo encoder. If the encoding and decoding format corresponding to the another stereo encoder is a first encoding and decoding format, and the encoding and decoding format corresponding to the stereo decoder is a second encoding and decoding format, in FIG. 15, the network device converts the audio signal from the second encoding and decoding format to the first encoding and decoding format.

In FIG. 14 and FIG. 15, the another stereo encoder and decoder and the stereo encoder and decoder correspond to different encoding and decoding formats respectively. Therefore, transcoding of the encoding and decoding format of the stereo signal is implemented after processing of the another stereo encoder and decoder and the stereo encoder and decoder.

It should be further understood that the stereo encoder in FIG. 14 can implement the encoding method for a stereo signal in the embodiments of this disclosure, and the stereo decoder in FIG. 15 can implement the decoding method for a stereo signal in the embodiments of this disclosure. The encoding apparatus in the embodiments of this disclosure may be the stereo encoder in the network device in FIG. 14, and the decoding apparatus in the embodiments of this disclosure may be the stereo decoder in the network device in FIG. 15. In addition, the network device in FIG. 14 and FIG. 15 may be specifically a wireless network communications device or a wired network communications device.

Figure 16:
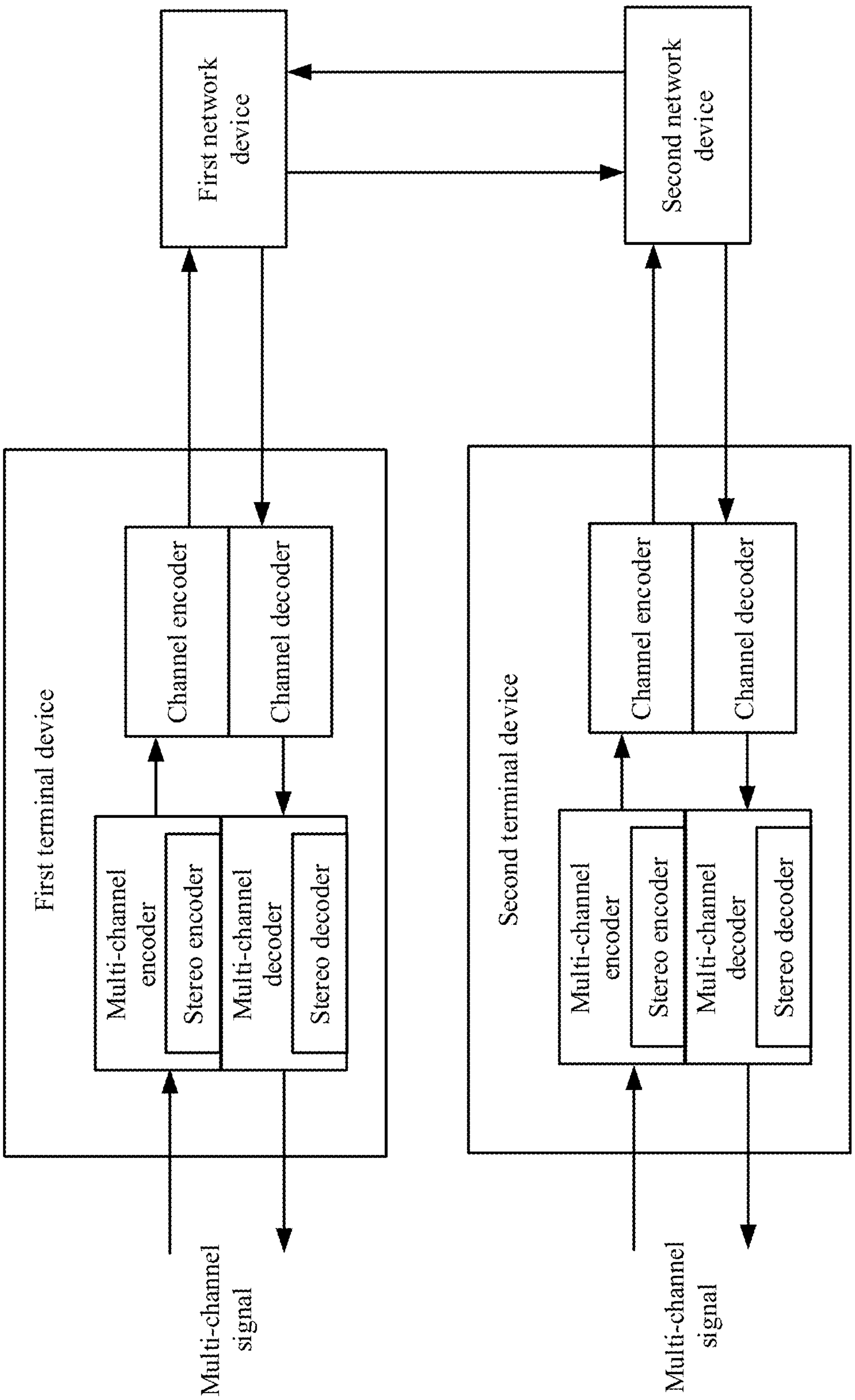
FIG. 16 is a schematic diagram of a terminal device according to an embodiment of this disclosure.
Figure 17:
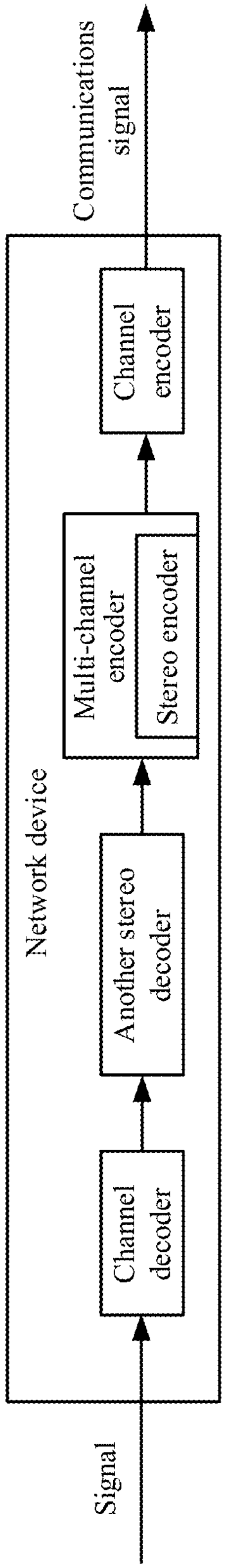
FIG. 17 is a schematic diagram of a network device according to an embodiment of this disclosure.
Figure 18:
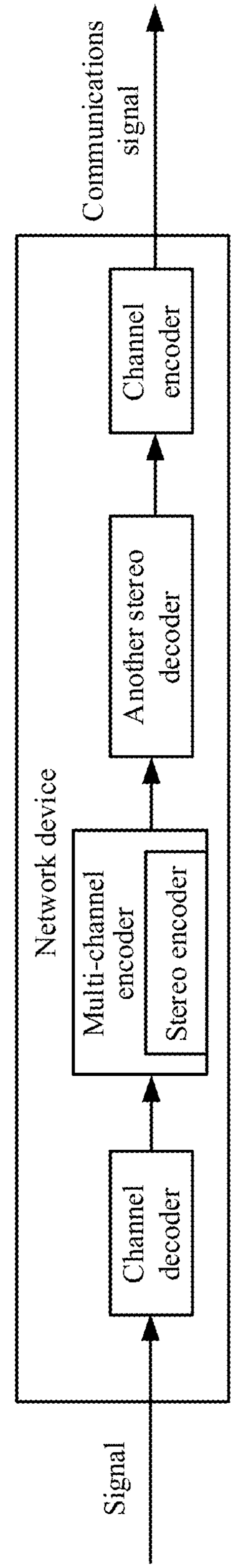
FIG. 18 is a schematic diagram of a network device according to an embodiment of this disclosure.

It should be understood that the encoding and decoding methods for a stereo signal in the embodiments of this disclosure may also be performed by a terminal device or a network device in FIG. 16 to FIG. 18. In addition, the encoding and decoding apparatuses in the embodiments of this disclosure may be further disposed in the terminal device or the network device in FIG. 16 to FIG. 18. Specifically, the encoding apparatus in the embodiments of this disclosure may be a stereo encoder in a multi-channel encoder in the terminal device or the network device in FIG. 16 to FIG. 18, and the decoding apparatus in the embodiments of this disclosure may be a stereo decoder in the multi-channel encoder in the terminal device or the network device in FIG. 16 to FIG. 18.

As shown in FIG. 16, in audio communication, a stereo encoder in a multi-channel encoder in a first terminal device performs stereo encoding on a stereo signal generated from a collected multi-channel signal. A bitstream obtained by the multi-channel encoder includes a bitstream obtained by the stereo encoder. A channel encoder in the first terminal device may further perform channel encoding on the bitstream obtained by the multi-channel encoder. Next, data obtained by the first terminal device after the channel encoding is transmitted to a second terminal device by using a first network device and a second network device. After the second terminal device receives the data from the second network device, a channel decoder of the second terminal device performs channel decoding, to obtain an encoded bitstream of the multi-channel signal, where the encoded bitstream of the multi-channel signal includes an encoded bitstream of the stereo signal. A stereo decoder in a multi-channel decoder in the second terminal device restores a stereo signal by decoding. The multi-channel decoder decodes the restored stereo signal to obtain a multi-channel signal. The second terminal device plays back the multi-channel signal. In this way, audio communication is completed between different terminal devices.

It should be understood that, in FIG. 16, the second terminal device may also encode the collected multi-channel signal (specifically, a stereo encoder in a multi-channel encoder of the second terminal device performs stereo encoding on the stereo signal generated from the collected multi-channel signal, a channel encoder in the second terminal device then performs channel encoding on a bitstream obtained by the multi-channel encoder), and finally, obtained data is transmitted to the first terminal device by using the second network device and the first network device. The first terminal device obtains a multi-channel signal by channel decoding and multi-channel decoding.

In FIG. 16, the first network device and the second network device may be wireless network communications devices or wired network communications devices. The first network device and the second network device may communicate with each other by using a digital channel.

The first terminal device or the second terminal device in FIG. 16 may perform the encoding and decoding methods for a stereo signal in the embodiments of this disclosure. In addition, the encoding apparatus in the embodiments of this disclosure may be the stereo encoder in the first terminal device or the second terminal device, and the decoding apparatus in the embodiments of this disclosure may be the stereo decoder in the first terminal device or the second terminal device.

In audio communication, a network device may implement transcoding of an encoding and decoding format of an audio signal. As shown in FIG. 17, if an encoding and decoding format of a signal received by a network device is an encoding and decoding format corresponding to another multi-channel decoder, a channel decoder in the network device performs channel decoding on the received signal, to obtain an encoded bitstream corresponding to the another multi-channel decoder. The another multi-channel decoder decodes the encoded bitstream, to obtain a multi-channel signal. A multi-channel encoder encodes the multi-channel signal, to obtain an encoded bitstream of the multi-channel signal. A stereo encoder in the multi-channel encoder performs stereo encoding on a stereo signal generated from the multi-channel signal to obtain an encoded bitstream of the stereo signal. The encoded bitstream of the multi-channel signal includes the encoded bitstream of the stereo signal. Finally, a channel encoder performs channel encoding on the encoded bitstream, to obtain a final signal (the signal may be transmitted to a terminal device or another network device).

Similarly, as shown in FIG. 18, if an encoding and decoding format of a signal received by a network device is the same as an encoding and decoding format corresponding to a multi-channel decoder, after a channel decoder of the network device performs channel decoding to obtain an encoded bitstream of a multi-channel signal, the multi-channel decoder may decode the encoded bitstream of the multi-channel signal, to obtain a multi-channel signal, where a stereo decoder in the multi-channel decoder performs stereo decoding on an encoded bitstream of a stereo signal in the encoded bitstream of the multi-channel signal. Next, another multi-channel encoder encodes the multi-channel signal based on another encoding and decoding format, to obtain an encoded bitstream of the multi-channel signal corresponding to the another multi-channel encoder. Finally, a channel encoder performs channel encoding on the encoded bitstream corresponding to the another multi-channel encoder, to obtain a final signal (the signal may be transmitted to a terminal device or another network device).

It should be understood that, in FIG. 17 and FIG. 18, the another multi-channel encoder and decoder and the multi-channel encoder and decoder correspond to different encoding and decoding formats respectively. For example, in FIG. 17, the encoding and decoding format corresponding to the another stereo decoder is a first encoding and decoding format, and the encoding and decoding format corresponding to the multi-channel encoder is a second encoding and decoding format. In this case, in FIG. 17, the network device converts the audio signal from the first encoding and decoding format to the second encoding and decoding format. Similarly, in FIG. 18, it is assumed that the encoding and decoding format corresponding to the multi-channel encoder is a second encoding and decoding format, and the encoding and decoding format corresponding to the another stereo decoder is a first encoding and decoding format. In this case, in FIG. 18, the network device converts the audio signal from the second encoding and decoding format to the first encoding and decoding format. Therefore, transcoding of the encoding and decoding format of the audio signal is implemented after processing of the another multi-channel encoder and decoder and the multi-channel encoder and decoder.

It should be further understood that the stereo encoder in FIG. 17 can implement the encoding method for a stereo signal in this disclosure, and the stereo decoder in FIG. 18 can implement the decoding method for a stereo signal in this disclosure. The encoding apparatus in the embodiments of this disclosure may be the stereo encoder in the network device in FIG. 17, and the decoding apparatus in the embodiments of this disclosure may be the stereo decoder in the network device in FIG. 18. In addition, the network device in FIG. 17 and FIG. 18 may be specifically a wireless network communications device or a wired network communications device.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular disclosures and design constraint conditions of the technical solutions. A person skilled in the art may use different methods to implement the described functions for each particular disclosure, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this disclosure, it should be understood that the disclosed systems, apparatuses, and methods may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this disclosure. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A decoding method for a stereo audio signal, comprising:

decoding a bitstream to obtain a first channel signal, a second channel signal, and a first inter-channel time difference (ITD) of a current frame of the stereo audio signal;

performing a mixing processing on the first channel signal and the second channel signal, to obtain a third channel reconstructed signal and a fourth channel reconstructed signal;

performing interpolation processing based on the first ITD and a second ITD of a previous frame previous to the current frame, to obtain a third ITD; and adjusting a delay of the third channel reconstructed signal and the fourth channel reconstructed signal based on the third ITD;

wherein the third ITD satisfies the following formula:

$$A=\alpha\cdot B+(1-\alpha)\cdot C,$$ wherein

A represents the third ITD, B represents the first ITD, and C represents the second ITD, wherein a represents a first interpolation coefficient, and α satisfies a formula α=(N−S)/N, wherein S represents an encoding and decoding delay and S equals to 192, and N represents a frame length of the current frame and N equals to 320.

2. A decoding apparatus for a stereo audio signal, comprising:

at least one processor; and one or more memories coupled to the at least one processor and storing programming instructions for execution by the at least one processor to cause the decoding apparatus to:

decode a bitstream to obtain a first channel signal, a second channel signal, and a first inter-channel time difference (ITD) of a current frame of the stereo audio signal;

perform a mixing processing on the first channel signal and the second channel signal, to obtain a third channel reconstructed signal and a fourth channel reconstructed signal;

perform interpolation processing based on the first ITD and a second ITD of a previous frame previous to the current frame, to obtain a third ITD; and adjust a delay of the third channel reconstructed signal and the fourth channel reconstructed signal based on the third ITD;

wherein the third ITD satisfies the following formula:

$$A=\alpha\cdot B+(1-\alpha)\cdot C,$$ wherein

A represents the third ITD, B represents the first ITD, and C represents the second ITD, wherein a represents a first interpolation coefficient, and α satisfies a formula α=(N−S)/N, wherein S represents an encoding and decoding delay and S equals to 192, and N represents a frame length of the current frame and N equals to 320.

3. A non-transitory computer-readable storage medium storing computer instructions, that when executed by one or more processors, cause the one or more processors to perform operations comprising:

decoding a bitstream to obtain a first channel signal, a second channel signal, and a first inter-channel time difference (ITD) of a current frame of a stereo audio signal;

performing a mixing processing on the first channel signal and the second channel signal, to obtain a third channel reconstructed signal and a fourth channel reconstructed signal;

performing interpolation processing based on the first ITD and a second ITD of a previous frame previous to the current frame, to obtain a third ITD; and adjusting a delay of the third channel reconstructed signal and the fourth channel reconstructed signal based on the third ITD;

wherein the third ITD satisfies the following formula:

$$A=\alpha\cdot B+(1-\alpha)\cdot C,$$ wherein

A represents the third ITD, B represents the first ITD, and C represents the second ITD, wherein a represents a first interpolation coefficient, and α satisfies a formula α=(N−S)/N, wherein S represents an encoding and decoding delay and S equals to 192, and N represents a frame length of the current frame and N equals to 320.

* * * * *